(12) United States Patent
Lascari et al.

(10) Patent No.: US 11,057,061 B2
(45) Date of Patent: *Jul. 6, 2021

(54) WIRELESS RADIO SYSTEM OPTIMIZATION BY PERSISTENT SPECTRUM ANALYSIS

(71) Applicant: Ubiquiti Inc., New York, NY (US)

(72) Inventors: Lance D. Lascari, Rochester, NY (US); Robert J. Pera, Seattle, WA (US)

(73) Assignee: UBIQUITI INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/789,269

(22) Filed: Feb. 12, 2020

(65) Prior Publication Data

US 2020/0186174 A1 Jun. 11, 2020

Related U.S. Application Data

(63) Continuation of application No. 16/232,858, filed on Dec. 26, 2018, now Pat. No. 10,623,030, which is a
(Continued)

(51) Int. Cl.
*H04B 1/00* (2006.01)
*H04B 1/26* (2006.01)
(Continued)

(52) U.S. Cl.
CPC ............ *H04B 1/0075* (2013.01); *H04B 1/14* (2013.01); *H04B 1/26* (2013.01); *H04B 1/28* (2013.01); *H04B 1/3805* (2013.01)

(58) Field of Classification Search
CPC combination set(s) only.
See application file for complete search history.

(56) References Cited

U.S. PATENT DOCUMENTS 2,455,888 A 12/1948 Brown
2,460,869 A 2/1949 Braden
(Continued)

FOREIGN PATENT DOCUMENTS

CN 202042599 U 11/2011
EP 2416449 A1 2/2012
(Continued)

OTHER PUBLICATIONS

Sanford; U.S. Appl. No. 16/854,858 entitled "Coaxial RF dual-polarized waveguide filter and method," filed Apr. 21, 2020.
(Continued)

*Primary Examiner* — Junpeng Chen
(74) *Attorney, Agent, or Firm* — Shay Glenn LLP

(57) ABSTRACT

Apparatuses and methods for simultaneously operating as a wireless radio and monitoring the local frequency spectrum. For example, described herein are wireless radio devices that use a secondary receiver to monitor frequencies within the operating band and prevent or avoid interferers, including in particular half-IF interferers. The systems, devices, and methods described herein may adjust the intermediate frequency in a superheterodyne receiver to select an intermediate frequency that minimizes interference. In particular, described herein are apparatuses and methods that use a second receiver which is independent of the first receiver and may be connected to the same receiving antenna to monitor the geographically local frequency spectrum and may detect spurious interferers, allowing the primary receiver to adjust the intermediate frequency and avoid spurious interferes.

20 Claims, 11 Drawing Sheets

Related U.S. Application Data continuation of application No. 14/918,349, filed on Oct. 20, 2015, now Pat. No. 10,205,471, which is a continuation of application No. 14/511,823, filed on Oct. 10, 2014, now Pat. No. 9,191,037.

(60) Provisional application No. 61/890,073, filed on Oct. 11, 2013, provisional application No. 62/019,359, filed on Jun. 30, 2014.

(51) Int. Cl.
   *H04B 1/14* (2006.01)
   *H04B 1/28* (2006.01)
   *H04B 1/3805* (2015.01)

(56) References Cited

U.S. PATENT DOCUMENTS

| | | |
|---|---|---|
| 3,140,491 A | 7/1964 | Ashbaugh et al. |
| 3,599,219 A | 8/1971 | Holtum et al. |
| 3,739,392 A | 6/1973 | Ross et al. |
| 4,578,638 A | 3/1986 | Takano et al. |
| 4,598,178 A | 7/1986 | Rollins |
| 4,626,863 A | 12/1986 | Knop et al. |
| 4,788,554 A | 11/1988 | Smith |
| 4,918,459 A | 4/1990 | De Teso |
| 5,010,348 A | 4/1991 | Rene et al. |
| 5,131,006 A | 7/1992 | Kamerman et al. |
| 5,151,920 A | 9/1992 | Haagh et al. |
| 5,295,154 A | 3/1994 | Meier et al. |
| 5,374,911 A | 12/1994 | Kich et al. |
| 5,402,136 A | 3/1995 | Goto et al. |
| 5,406,260 A | 4/1995 | Cummings et al. |
| 5,422,887 A | 6/1995 | Diepstraten et al. |
| 5,428,636 A | 6/1995 | Meier |
| 5,446,792 A | 8/1995 | Sango |
| 5,504,746 A | 4/1996 | Meier |
| 5,521,983 A | 5/1996 | Thompson, III et al. |
| 5,546,397 A | 8/1996 | Mahany |
| 5,625,365 A | 4/1997 | Tom et al. |
| 5,706,428 A | 1/1998 | Boer et al. |
| 5,740,366 A | 4/1998 | Mahany et al. |
| 5,760,739 A | 6/1998 | Pauli |
| 5,760,749 A | 6/1998 | Minowa et al. |
| 5,844,893 A | 12/1998 | Gollnick et al. |
| 5,907,310 A | 5/1999 | Seewig et al. |
| 5,936,542 A | 8/1999 | Kleinrock et al. |
| 5,940,771 A | 8/1999 | Gollnick et al. |
| 5,943,430 A | 8/1999 | Saitoh |
| 6,130,892 A | 10/2000 | Short et al. |
| 6,137,449 A | 10/2000 | Kildal |
| 6,169,522 B1 | 1/2001 | Ma et al. |
| 6,184,840 B1 | 2/2001 | Hsin-Loug et al. |
| 6,194,992 B1 | 2/2001 | Short et al. |
| 6,337,990 B1 | 1/2002 | Koshino |
| 6,374,311 B1 | 4/2002 | Mahany et al. |
| 6,437,757 B1 | 8/2002 | Butler |
| 6,522,305 B2 | 2/2003 | Sharman |
| 6,563,786 B1 | 5/2003 | Van Nee |
| 6,636,894 B1 | 10/2003 | Short et al. |
| 6,665,536 B1 | 12/2003 | Mahany |
| 6,697,415 B1 | 2/2004 | Mahany |
| 6,714,559 B1 | 3/2004 | Meier |
| 6,789,110 B1 | 9/2004 | Short et al. |
| 6,795,035 B2 | 9/2004 | Jocher |
| 6,795,852 B1 | 9/2004 | Kleinrock et al. |
| 6,810,426 B2 | 10/2004 | Mysore et al. |
| 6,857,009 B1 | 2/2005 | Ferreria et al. |
| 6,868,399 B1 | 3/2005 | Short et al. |
| 6,970,680 B1 | 11/2005 | Tomoe |
| 7,020,082 B2 | 3/2006 | Bhagavath et al. |
| 7,088,727 B1 | 8/2006 | Short et al. |
| 7,117,526 B1 | 10/2006 | Short |
| 7,155,196 B1 | 12/2006 | Beard |
| 7,194,554 B1 | 3/2007 | Short et al. |
| 7,197,556 B1 | 3/2007 | Short et al. |
| 7,254,191 B2 | 8/2007 | Sugar et al. |
| 7,295,165 B2 | 11/2007 | Ferguson et al. |
| 7,295,812 B2 | 11/2007 | Haapoja et al. |
| 7,386,002 B2 | 6/2008 | Meier |
| 7,457,646 B2 | 11/2008 | Mahany et al. |
| 7,577,398 B2 | 8/2009 | Judd et al. |
| 7,656,363 B2 | 2/2010 | Devicque et al. |
| 7,715,800 B2 | 5/2010 | Sinha |
| 7,739,383 B1 | 6/2010 | Short et al. |
| 7,752,334 B2 | 7/2010 | Paunikar et al. |
| 7,800,551 B2 | 9/2010 | McCown |
| 7,826,426 B1 | 11/2010 | Bharghavan et al. |
| 8,077,113 B2 | 12/2011 | Syed et al. |
| 8,190,708 B1 | 5/2012 | Short et al. |
| 8,335,272 B2 | 12/2012 | Roberts |
| 8,385,869 B2 | 2/2013 | Feenaghty et al. |
| 8,466,847 B2 | 6/2013 | Pera et al. |
| 8,483,188 B2 | 7/2013 | Walton et al. |
| 8,493,279 B2 | 7/2013 | Pera et al. |
| 8,581,795 B2 | 11/2013 | Simms et al. |
| 8,804,622 B1 | 8/2014 | Thai et al. |
| 8,836,601 B2 | 9/2014 | Sanford et al. |
| 9,151,572 B1 | 10/2015 | Sieracki |
| 9,191,037 B2 | 11/2015 | Lascari et al. |
| 9,397,820 B2 | 7/2016 | Schulz et al. |
| 9,490,533 B2 | 11/2016 | Sanford et al. |
| 9,496,620 B2 | 11/2016 | Schulz et al. |
| 9,543,635 B2 | 1/2017 | Schulz et al. |
| 9,634,373 B2 | 4/2017 | Lee et al. |
| 9,912,034 B2 | 3/2018 | Sanford et al. |
| 9,941,570 B2 | 4/2018 | Sanford et al. |
| 9,972,912 B2 | 5/2018 | Schulz et al. |
| 10,069,580 B2 | 9/2018 | Hardy et al. |
| 10,136,233 B2 | 11/2018 | Lee et al. |
| 10,205,471 B2 | 2/2019 | Lascari et al. |
| 10,312,598 B2 | 6/2019 | Schulz et al. |
| 10,367,592 B2 | 7/2019 | Hardy et al. |
| 10,566,676 B2 | 2/2020 | Sanford et al. |
| 10,623,030 B2 | 4/2020 | Lascari et al. |
| 2002/0044032 A1 | 4/2002 | Guguen et al. |
| 2002/0098805 A1 | 7/2002 | King |
| 2002/0177425 A1 | 11/2002 | Li |
| 2003/0032398 A1 | 2/2003 | Harris |
| 2003/0038753 A1 | 2/2003 | Mahon |
| 2003/0203743 A1 | 10/2003 | Sugar et al. |
| 2003/0207669 A1 | 11/2003 | Kroeger |
| 2003/0221304 A1 | 12/2003 | Janssen et al. |
| 2003/0224801 A1 | 12/2003 | Lovberg et al. |
| 2004/0071298 A1 | 4/2004 | Geeng |
| 2004/0108966 A1 | 6/2004 | McKivergan et al. |
| 2004/0132424 A1 | 7/2004 | Aytur et al. |
| 2005/0245254 A1 | 11/2005 | Hall |
| 2006/0001589 A1 | 1/2006 | Nicolae |
| 2006/0007044 A1 | 1/2006 | Crouch et al. |
| 2006/0009177 A1 | 1/2006 | Persico et al. |
| 2007/0057860 A1 | 3/2007 | Jaffer et al. |
| 2007/0132651 A1 | 6/2007 | Nilsson |
| 2007/0157482 A1 | 7/2007 | Wallace |
| 2008/0199037 A1 | 8/2008 | Xu et al. |
| 2008/0224938 A1 | 9/2008 | Udagawa et al. |
| 2008/0240313 A1* | 10/2008 | Deisher ............. H03D 13/004 375/346 |
| 2008/0261548 A1 | 10/2008 | Krone |
| 2008/0297425 A1 | 12/2008 | Axton et al. |
| 2009/0174622 A1* | 7/2009 | Kanou ............... H04B 1/0064 343/876 |
| 2009/0267701 A1 | 10/2009 | Parsa et al. |
| 2009/0295677 A1 | 12/2009 | Gratton et al. |
| 2009/0310721 A1 | 12/2009 | Redfern et al. |
| 2009/0322648 A1 | 12/2009 | Bishop et al. |
| 2010/0013729 A1 | 1/2010 | Harel et al. |
| 2010/0053022 A1 | 3/2010 | Mak et al. |
| 2010/0152600 A1 | 6/2010 | Droitcour et al. |
| 2010/0245187 A1 | 9/2010 | Omuro et al. |
| 2010/0285769 A1 | 11/2010 | Conroy et al. |
| 2010/0289705 A1 | 11/2010 | Shtrom et al. |
| 2011/0012801 A1 | 1/2011 | Monte et al. |
| 2011/0068988 A1 | 3/2011 | Monte |

(56) References Cited

U.S. PATENT DOCUMENTS

| | | |
|---|---|---|
| 2011/0168480 A1 | 7/2011 | Sterling et al. |
| 2011/0181479 A1 | 7/2011 | Martin et al. |
| 2011/0258678 A1 | 10/2011 | Cowling et al. |
| 2012/0013516 A1 | 1/2012 | Ahn et al. |
| 2012/0176608 A1 | 7/2012 | McCown |
| 2012/0213086 A1 | 8/2012 | Matsuura |
| 2012/0250793 A1 | 10/2012 | Khatana et al. |
| 2012/0274208 A1 | 11/2012 | Chen et al. |
| 2013/0002515 A1 | 1/2013 | Hills et al. |
| 2013/0012134 A1 | 1/2013 | Jin et al. |
| 2013/0017794 A1 | 1/2013 | Kloper et al. |
| 2013/0028150 A1 | 1/2013 | Ma et al. |
| 2013/0113993 A1 | 5/2013 | Dagit, III |
| 2013/0135146 A1 | 5/2013 | Ransom et al. |
| 2013/0154894 A1 | 6/2013 | Caimi et al. |
| 2013/0163770 A1 | 6/2013 | Takemura |
| 2013/0249754 A1 | 9/2013 | Rice |
| 2013/0271337 A1 | 10/2013 | Lee et al. |
| 2014/0118220 A1 | 5/2014 | Ley |
| 2014/0169194 A1* | 6/2014 | Banerjee ............ H04W 24/06 370/252 |
| 2014/0274177 A1 | 9/2014 | Carbajal |
| 2014/0315599 A1 | 10/2014 | Teichmann et al. |
| 2015/0133060 A1 | 5/2015 | Duan |
| 2015/0256275 A1 | 9/2015 | Hinman et al. |
| 2015/0292948 A1 | 10/2015 | Goldring et al. |
| 2015/0349427 A1 | 12/2015 | Camden et al. |
| 2016/0183353 A1 | 6/2016 | Louh et al. |
| 2016/0218406 A1 | 7/2016 | Sanford |
| 2017/0229773 A1 | 8/2017 | Lee et al. |
| 2018/0269554 A1 | 9/2018 | Sanford |
| 2019/0069108 A1 | 2/2019 | Lee et al. |
| 2019/0280788 A1 | 9/2019 | Hardy et al. |
| 2019/0372235 A1 | 12/2019 | Schulz et al. |
| 2020/0185809 A1 | 6/2020 | Sanford et al. |

FOREIGN PATENT DOCUMENTS

| | | |
|---|---|---|
| JP | S54-95157 U | 7/1979 |
| JP | 2002299940 A | 10/2002 |
| JP | 2007259001 A | 10/2007 |
| JP | 2010192992 A | 9/2010 |
| JP | 2012227863 A | 11/2012 |
| KR | 10-20080079357 A | 9/2008 |
| KR | 200450128 Y1 | 8/2010 |
| KR | 101023789 B1 | 3/2011 |
| KR | 101068766 B1 | 9/2011 |
| WO | WO98/40990 A1 | 9/1998 |
| WO | WO01/31855 A2 | 5/2001 |
| WO | WO01/31886 A2 | 5/2001 |
| WO | WO01/86877 A2 | 11/2001 |
| WO | WO2008/042804 A2 | 4/2008 |
| WO | WO2008/154514 A2 | 12/2008 |
| WO | WO2009/131219 A1 | 10/2009 |
| WO | WO2011/005710 A2 | 1/2011 |
| WO | WO2013/071810 A1 | 5/2013 |
| WO | WO2014/017325 A1 | 1/2014 |
| WO | WO2015/054567 A1 | 4/2015 |

OTHER PUBLICATIONS

Le-Ngoc et al.; Design aspects and performance evaluation of ATCS mobile data link; IEEE 39th; InVehicular Technology Conference; pp. 860-867; May 1, 1989.

* cited by examiner

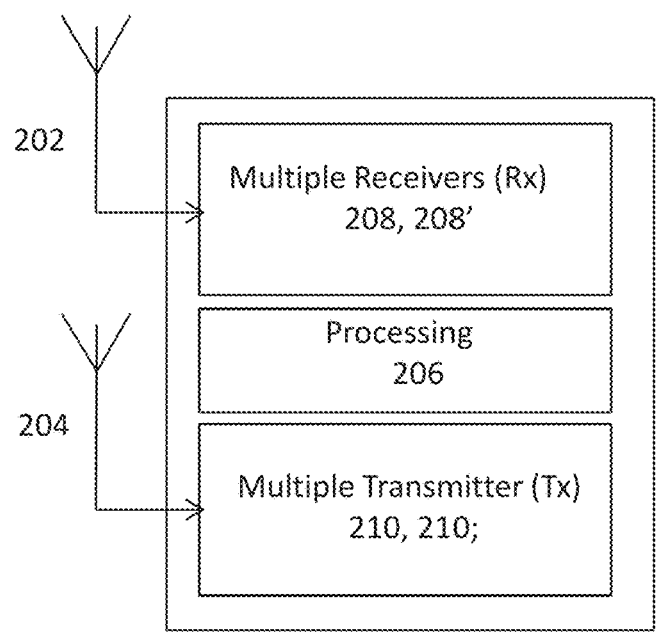
FIG. 2A
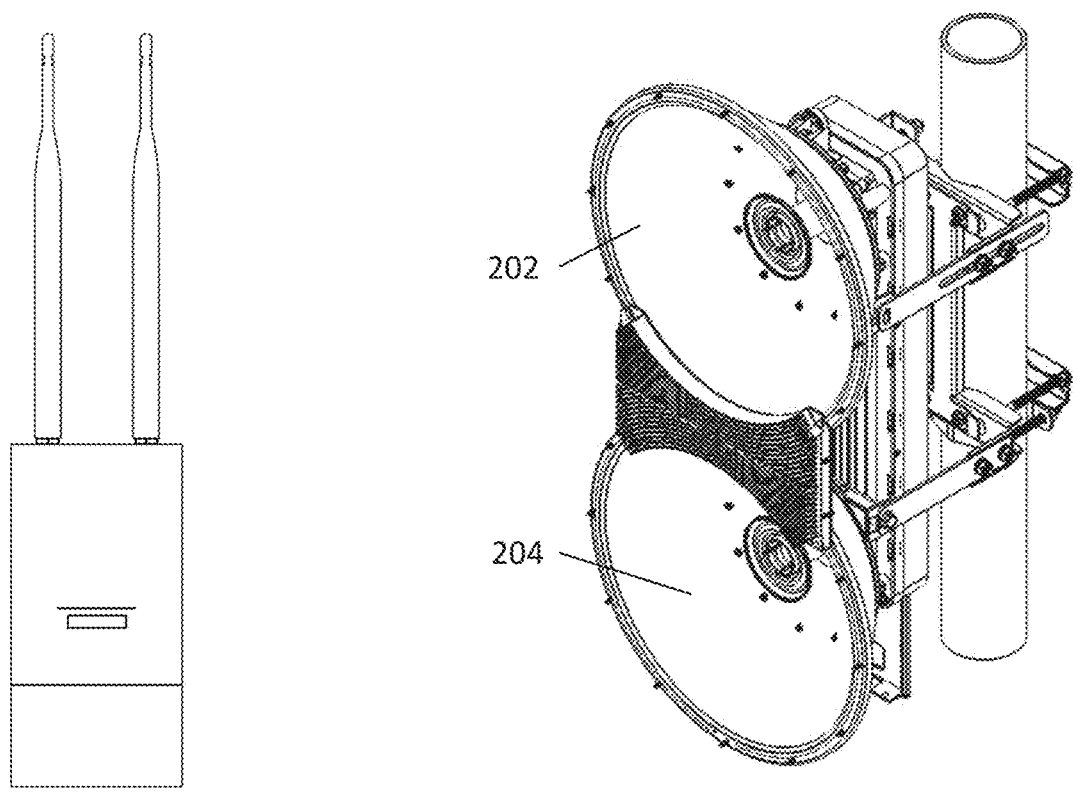
FIG. 2B
FIG. 2C

WIRELESS RADIO SYSTEM OPTIMIZATION BY PERSISTENT SPECTRUM ANALYSIS

CROSS REFERENCE TO RELATED APPLICATIONS

This application is a continuation of U.S. patent application Ser. No. 16/232,858, filed on Dec. 26, 2018, titled "WIRELESS RADIO SYSTEM OPTIMIZATION BY PERSISTENT SPECTRUM ANALYSIS," (now Publication No. US-2019-0132014-A1), which is a continuation of U.S. patent application Ser. No. 14/918,349, filed on Oct. 20, 2015, titled "WIRELESS RADIO SYSTEM OPTIMIZATION BY PERSISTENT SPECTRUM ANALYSIS," (now U.S. Pat. No. 10,205,471), which is a continuation of U.S. patent application Ser. No. 14/511,823, filed on Oct. 10, 2014, titled "WIRELESS RADIO SYSTEM OPTIMIZATION BY PERSISTENT SPECTRUM ANALYSIS." (now U.S. Pat. No. 9,191,037), which claims priority to U.S. Provisional Patent Application No. 61/890,073, filed on Oct. 11, 2013, and titled "SPURIOUS FREQUENCY ELIMINATION IN RADIO SYSTEMS FOR LONG-RANGE HIGH-SPEED WIRELESS COMMUNICATION." and U.S. Provisional Patent Application No. 62/019,359, filed on Jun. 30, 2014, and titled "WIRELESS RADIO SYSTEM OPTIMIZATION BY PERSISTENT SPECTRUM ANALYSIS," each of which is herein incorporated by reference in its entirety.

This patent application may be related to U.S. patent application Ser. No. 13/871,882 (now U.S. Pat. No. 9,398,636), filed on Apr. 26, 2013, which is a continuation of U.S. patent application Ser. No. 13/448,610 (now U.S. Pat. No. 8,467,759), filed on Apr. 17, 2012, which is a continuation of U.S. patent application Ser. No. 12/618,690 (now U.S. Pat. No. 8,219,059), filed on Nov. 13, 2009, each of which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

Described herein are wireless communications systems and methods, including broadband wireless radios such as IEEE 802.11 radios that independently and continuously monitor the spectrum of the operating band. In some variations, these radios are adapted to use the spectrum information (either local or regional) to avoid spurious interference from interferers, such as the half-IF frequency.

BACKGROUND

Wireless communication devices and wireless networks have proliferated in recent years. This has resulted in region having different electromagnetic spectrum profiles. For example, in some regions geographic as well as population conditions have resulted in relatively crowded local frequency spectra. Although both regulatory agencies (such as the FCC in the United States) and manufacturers have attempted to regulate and minimize such crowding, it has proven difficult to optimize and prevent interference across commercially relevant portions of the electromagnetic spectrum. In particular, electromagnetic interference, from both natural and man-made sources, is difficult to predict and to avoid. Unfortunately, electromagnetic interference causes significant problems for wireless devices and networks. Electromagnetic interference can arise from other communication devices even if those other devices use a different carrier frequency. For example, a cordless telephone using a first carrier frequency could generate electromagnetic interference that makes it difficult for a communication device using a second carrier frequency to maintain connection to a local area network (LAN). Electromagnetic interference might also arise from electronic devices other than communication devices (e.g., microwave ovens, etc.).

Determining the source of interference and/or preventing or avoiding it has proven difficult. One reason for the challenge is that the interference may be sporadic. Another reason is that device could be mobile, as could sources of interference.

Since electromagnetic interference can be highly local, and interference in the electromagnetic spectrum seen by some devices may not be seen by other devices even in the same network, it would be helpful to be able to monitor local interference at a wireless radio device, including at both ends of link in a network, such as at an access point (AP) and at an end device (e.g., a customer provided equipment, or CPE). In addition, since electromagnetic "traffic" and interference may vary greatly over time, it would be helpful to monitor continuously.

As an example, a particular wireless communication device that operates in compliance with an 802.11 protocol might be experiencing periodic problems associated with electromagnetic interference. An analysis of the local frequency spectrum content of the operating band may be used to optimize performance of the local device as well an entire network. Spectrum content can be determined by a spectrum analyzer, which can monitor frequency domain.

Thus, there is a need for devices and systems, and particularly wireless radio devices and systems, that provide both local monitoring of the frequency spectrum of a broadly-defined operating band while concurrently (and in some cases independently) receiving and transmitting wireless radio frequency signals.

In superheterodyne receivers there are known vulnerabilities or spurious responses which may interfere with signal transmission. There are many types spurious interference, including, for example, the half-intermediate frequency (or "half-IF") response. In such receiver circuits, mixers typically translate a high input radio frequency (RF) to a lower intermediate frequency (IF). This process is known as down-conversion utilizing the difference term between a mixer's RF input and a local oscillator input (LO) for low-side injection (LO frequency<RF frequency) or the difference term between the mixer's LO and RF for high-side injection. This down conversion process can be described by the following equation: $f_{IF}=\pm f_{RF} \pm f_{LO}$, where $f_{IF}$ is the intermediate frequency at the mixer's output port, $f_{RF}$ is any RF signal applied to the mixer's RF input port, and $f_{LO}$ is the local oscillator signal applied to the mixer's LO input port.

Ideally, the mixer output signal amplitude and phase are proportional to the input signal's amplitude and phase and independent of the LO signal characteristics. Under this assumption, the amplitude response of the mixer is linear for the RF input and is independent of the LO input. However, mixer nonlinearities may produce undesired mixing products called spurious responses, which are caused by undesired signals reaching the mixer's RF input port and producing a response at the IF frequency. The signals reaching the RF input port do not necessarily have to fall into the desired RF band to be troublesome. Many of these signals are sufficiently high in power level that the RF filters preceding the mixer don't provide enough selectivity (e.g., rejection) to keep them from causing additional spurious responses. When they interfere with the desired IF frequency, the mixing mechanism can be described by: $f_{IF}=\pm m^*f_{RF} \pm n^*f_{LO}$. Note that m and n are integer harmonics of both the RF and LO frequencies that mix to create numerous combinations of spurious products. The amplitude of these spurious components typically decreases as the value of m or n increases.

Knowing the desired RF frequency range, frequency planning is used to carefully select the IF and resulting LO frequency selections to avoid spurious mixing products whenever possible. Filters are typically used to reject out-of-band RF signals that might cause in-band IF responses. IF filter selectivity following the mixer is specified to pass only the desired frequencies thereby filtering the spurious response signals ahead of the final detector. However, spurious responses that appear within the IF band will not be attenuated by the IF filter.

The half-IF spurious response is a particularly troublesome 2nd-order spurious response, which may be defined for the mixer indices of (m=2, n=−2) for low-side injection and (m=−2, n=2) for high-side injection. For low-side injection, the input frequency that creates the half-IF spurious response is located below the desired RF frequency by an amount $f_{IF}/2$ from the desired RF input frequency.

The half-IF frequency represents a frequency where interference will be converted to the IF frequency just like the desired receiver signal, but at a reduced efficiency. Unlike the image which is relatively easy to filter out due to the large frequency difference from the desired signal, or signals that may cause blocking (which require very large signals), the half-IF response can significantly impact achievable performance. Other spurious responses may be found at other frequencies within the transmission bandwidth. In order to make a broadband wireless radio device more selective, described herein are superheterodyne receivers that may mitigate the vulnerabilities/side-effects described above. In particular, described herein are devices and mechanisms that alter the intermediate frequency based on the detected or predicted distractors (e.g., spurious responses) at predetermined frequencies, including in particular the half-IF spurious response. This mechanism of dynamically changing the frequency plan in response to actual interference to avoid predictable spurious is applicable to other spurious vulnerabilities as well as the half-IF frequency (e.g., adjacent channel interference, 2×2 spurious responses, and other interferers).

SUMMARY OF THE DISCLOSURE

Described herein are wireless radio apparatuses (devices and systems) that include integrated spectrum analyzers. For example, described herein are devices and systems that include a first wireless radio receiver and transmitter (or transceiver) that operates in parallel with a second receiver; the second receiver may be configured as a spectrum analyzer, and continuously scans the operating band. Thus, in any of the devices described herein, the spectrum analyzer portion and the first receiver may be operated concurrently and independently of each other. Information on the spectrum that comes from monitoring the operating band may be stored, analyzed and/or transmitted by a processor that is associated with the spectrum analyzer, referred to herein as a spectrum processor. The spectrum information may be encrypted and may be transmitted to one or more remote processors (including servers) using the transmitter (Tx) that is used for normal operation of the wireless radio, or the spectrum analyzer may include a dedicated transmitter (or transceiver).

For example, described herein are wireless radio devices that are configured to wirelessly receive and transmit radio frequency signals in an operating band and have an integrated spectrum analyzer. The spectrum analyzer may be configured to operate continuously or continuously or constantly. For example, the spectrum analyzer may be adapted to constantly scan an operating band, and after one or more (predetermined) scan, may pause before starting the next scan or sets of scans. For example, a wireless radio device configured to wirelessly receive and transmit radio frequency signals in an operating band having an integrated spectrum analyzer may include: an antenna (e.g., a receive antenna); a first receiver coupled to the antenna by a first receiving path for receiving a radio frequency signal within the operating band from the antenna; a spectrum analyzer operating in parallel with the first receiving path, wherein the spectrum analyzer is configured to continuously scan through the operating band and collect spectrum information on the operating band concurrent with the first receiver receiving the radio frequency signal; and a spectrum processor coupled to the spectrum analyzer and configured to wirelessly transmit the spectrum information to a remote spectrum analysis unit.

The antenna may be for both receiving and transmission, or it may be a dedicated receive antenna. Although the primary receiver (or transceiver) may operate with the same antenna (and in parallel) as the receiver adapted to operate as the spectrum analyzers, the spectrum analyzer may use a separate (e.g., dedicated) antenna.

The general-purpose receiver of the device or system typically receives radio frequency signals within an operating band, as described in greater detail below, may operate in one or more channels and may be switches between channels within the operating band. The spectrum analyzer typically scans through all of the channels of the operating band. In some variations, the spectrum analyzer may scan though a band that is larger than the operating band, for example, bracketing the operating band on one or both sides of the spectrum.

A wireless radio device configured to wirelessly receive and transmit radio frequency signals in an operating band may include: an antenna; a first receiver coupled to the antenna by a first receiving path for receiving a radio frequency signal from the antenna; a second receiving path in parallel with the first receiving path, the second receiving path coupled to the antenna and connected to a spectrum analyzer, wherein the spectrum analyzer is configured to continuously scan the operating band while the first receiver receives the radio frequency signal and to record spectrum information on the operating band; and a spectrum processor coupled to the spectrum analyzer and configured to encode the spectrum information for transmission to a remote spectrum analysis unit.

Any of these devices may also include a first transmitter coupled to the antenna for transmitting radio frequency signals from the antenna. A high-selectivity receiver may also be included in the first receiving path, and configured to select an operational frequency (e.g., channel) for the first receiver from within the operating band.

The first receiver may be part of a transceiver comprising both a transmitter and a receiver. In general, the first receiver may operate independently of (and simultaneously with) the spectrum analyzer.

In general, the spectrum processor may be separate than a processor that operates/control operation of the primary receiver (and/or transmitter and/or transceiver). For example, the spectrum processor may be configured to store, transmit, and/or analyze the spectrum information, as well as control the scanning of the spectrum by the spectrum analyzer (secondary receiver). For example, a spectrum processor of a spectrum analyzer may be configured to store spectrum information for later transmission. In some variations the spectrum processor may be configured to prepare the spectrum information for storage and/or transmission. For example, the spectrum processor may be configured to compress, extract, or encode the spectrum information for storage and/or transmission. For example, the spectrum processor may also attach additional information, such as identifying information for the device (wireless radio device) including a unique identifier specific to the device, and/or information about the general type of the device (model, year, etc.), time/date information may also be bundled with the spectrum information. The spectrum processor may therefore store the information and transmit it either continuously or discretely. The spectrum processor may use a dedicated transmitter and/or it may use the primary transmitter of the wireless radio device. For example, the spectrum information may be encoded and passed for transmission by the device (e.g., to a remote server) in a manner that does not interrupt normal operation of the wireless radio device (in the absence of the dedicated transmitter).

Also described herein are general methods of simultaneously monitoring a frequency spectrum of an operating band and transmitting and receiving wireless information within the operating band. Any of these methods may be performed by the apparatuses (device and systems) described herein. For example, a method of simultaneously monitoring a frequency spectrum of an operating band and transmitting and receiving wireless information within the operating band may include: receiving and transmitting radio frequency signals within the operating band using a wireless radio device including an integrated spectrum analyzer; continuously monitoring the frequency spectrum of the operating band concurrently with receiving and transmitting the radio frequency signals using the spectrum analyzer of the wireless radio device; and transmitting spectrum information collected from the spectrum analyzer to a remote spectrum analysis unit.

Another method of simultaneously and independently monitoring a frequency spectrum of an operating band and transmitting and receiving wireless information within the operating band may include: receiving and transmitting a radio frequency signal within the operating band using a wireless radio device having an integrated spectrum analyzer; continuously monitoring the frequency spectrum of the operating band and encoding the spectrum information using the spectrum analyzer of the wireless radio device concurrently with receiving and transmitting the radio frequency signal within the operating band; and transmitting the spectrum information to a remote spectrum analysis unit.

As mentioned, in any of these methods, the spectrum information in the wireless radio device may be stored, for later analysis and/or transmission. Any of the methods described herein may also include encoding the spectrum information in the wireless radio device.

The primary receiver may operate completely or partially independent of the spectrum analyzer (e.g., a secondary receiver configured to operate as a spectrum analyzer). For example, receiving (and transmitting) radio frequency signals may include operating a receiver, transmitter or transceiver of the wireless radio device without input from the spectrum analyzer. For example, in some variations the devices described herein are adapted to provide local frequency spectrum information about the frequency environment of the device to a remote spectrum analysis apparatus. However, as described below, in some variations information about certain specific frequencies may be used by the primary receiver (and/or transmitter) to modify the operation of the device.

For example in some variations a device having a primary receiver and a secondary receiver may be configured so that the secondary receiver (which may be configured as a spectrum analyzer) looks at specific (e.g., predetermined) frequencies in order to avoid interference. In particular, described herein are apparatuses and methods for wireless broadband radio reception that prevent or avoid interferers, including in particular half-IF interferers. In general, described herein are apparatuses, including systems and devices, and methods that adjust the intermediate frequency in a superheterodyne receiver to select an intermediate frequency that minimizes interference at one or more predetermined frequencies. In particular, described herein are apparatuses and methods that use a second receiver, which is independent of the first receiver, and may be connected to the same receiving antenna, to detect the frequency location(s) of spurious interferers, and select or adjust the intermediate frequency using this information. The predetermined location of the spurious interferer may be calculated (e.g., the half-IF frequency of the system) or it may be determined empirically, by scanning or otherwise examining the bandwidth before or concurrently with operating the receiver, e.g., using a second receiver, spectrum analyzer, or receiver configured as a spectrum analyzer.

For example, described herein are methods of controlling reception for a wireless broadband radio by selecting between a plurality of intermediate frequencies (IFs) to minimize interference at first predetermined frequency (such as the half-IF frequency interference). Any of these methods may include: receiving a radio frequency (RF) signal having a frequency $f_{sg}$ in a first receive path having a mixer for generating an intermediate frequency (IF) signal from the RF signal by mixing the RF signal with a local oscillation (LO) signal having a local oscillation frequency $f_{LO}$; wherein the intermediate frequency is initially set to a first intermediate frequency, $f_{IF1}$; determining an interference in the RF signal at the first predetermined frequency; and switching the intermediate frequency to a second intermediate frequency, $f_{IF2}$, and generating the IF signal from the RF signal at the second intermediate frequency if the interference in the RF signal at the first predetermined frequency exceeds a threshold level. When the first predetermined frequency is the half-IF frequency it may correspond to the one-half of $f_{IF1}$ (a half-IF1 frequency).

As mentioned above, the predetermined frequency may be the half-IF frequency. Spurious interferers at other predetermined frequencies may also be avoided. As used herein, the first (or second, third, etc.) predetermined frequency is predetermined in that it is known ahead of time by the receiver. It may be calculated from a current or proposed IF (e.g., the half-IF frequency) or it may be identified ahead of time by scanning the bandwidth (e.g., using a spectrum analyzer, receiver operating as a spectrum analyzer, etc.). In particular, the predetermined frequency may be determined by scanning the bandwidth using an auxiliary receiver (which may also be referred to as a monitoring receiver) that is independent of the primary receiver. In general the first or other predetermined frequencies may also be referred to as spurious interferer frequencies. For example, the first predetermined frequency may be referred to as a first spurious interferer frequency; the frequency may or may not actual include spurious interference. In some variations the first predetermined frequency is a frequency in which it is likely that spurious interference will be present.

In any of these examples, generating the IF signal at the second intermediate frequency may include modifying $f_{LO}$ to shift the IF to $f_{IF2}$.

Any of these methods may also include receiving the RF signal in a wireless broadband radio comprising a first receiver having the first receive path and a second receiver having a second receive path, wherein the first and second receivers are both coupled to the same receiving antenna configured to receive an RF band. The second receiver may be a monitoring receiver configured to scan the band for interference independently of the first receiver. Either or both the first and second receivers may be 802.11 receivers.

In general, a second receiver (e.g., a monitoring receiver) may be used as a backup or redundant channel. For example, switching the intermediate frequency to a second intermediate frequency may further comprise receiving the RF signal in a second receive path while switching the IF to $f_{IF2}$ to prevent an interruption in data traffic during switching.

Further, determining the interference in the RF signal at the first predetermined frequency (such as the half-IF1 frequency) may comprise monitoring a band including the RF frequency and the first predetermined frequency (e.g., half-IF1) on a second receive path that is independent of the first receive path. In general, the method may also include determining an interference signal/level in the RF signal at a second predetermined frequency. For example, the second predetermined frequency may be the one-half of $f_{IF2}$ (a half-IF2 frequency).

The threshold for determining switching of the IF frequency (e.g., from IF1 to IF2) may include a comparison between the energy in the RF band at the first predetermined frequency (such as the half-IF frequency of the first IF, IF1) and energy in the RF band at the second predetermined frequency (such as the half-IF frequency of the second IF, IF2). For example, switching may comprise switching the intermediate frequency to the second intermediate frequency and generating the IF signal from the RF signal at the second intermediate frequency if the interference in the RF signal at the half-IF1 frequency is greater than the interference in the RF signal at the half-IF2 frequency. In some variations, the switch may be triggered if the interference in the first predetermined frequency is more than an offset (e.g. a predetermined offset) from the interference at the second predetermined frequency; for example, the method (or an apparatus implementing the method) may trigger switching if the interference at the first predetermined frequency is more than 10 dB greater than the interference at the second predetermined frequency.

Thus, in general, the method may include switching the intermediate frequency from the second intermediate frequency back to the first intermediate frequency if an interference in the RF signal at the second predetermined frequency exceeds a threshold level. For example, the method may include switching the intermediate frequency from the second intermediate frequency back to the first intermediate frequency if an interference in the RF signal at the second predetermined frequency exceeds the interference in the RF signal at the first predetermined frequency.

In any of the methods and apparatuses described herein, the IF may be switched from an initial IF to a new IF that is slightly shifted relative the initial IF. The initial IF may be referred to as a "first IF" and the new IF may be referred to as a "second IF" (or additional IFs, e.g., third IF, fourth IF, fifth IF, etc.). The frequencies of the first IF (IF1) and second IF (IF2) may be slightly shifted relative to each other. For example, the frequency of the second IF may be laterally shifted relative to the first IF (e.g., the new IF may be shifted relative to the initial IF by between about 10 MHz and about 250 MHz, between about 20 MHz and 200 MHz, between about 40 MHz and 150 MHz, etc.). In some embodiments, the initial IF and the new IF may be selected to be sufficiently nearby to permit the same filters that are adapted for use with the initial IF to be used with the new (shifted) IF, e.g., shifting within the bandwidth of the filter of the apparatus, while still providing sufficiently different the first and second predetermined frequencies (e.g., the half-IF) to avoid a spurious interferer that may be at or near one of the predetermined frequencies. In some variations the methods and apparatuses may switch to a new (e.g., second) set of filters for use with the second IF (IF2). For example, switching the intermediate frequency to the second intermediate frequency may comprise switching the intermediate frequency from the first intermediate frequency to an intermediate frequency that is between about 10 MHz and about 250 MHz from the first intermediate frequency. One of skill in the art should understand that the terms "first IF" and "second IF" as used herein does not refer to cascading or using an intermediate step-down in frequency that may be used during superheterodying (e.g., converting from 150 MHz down to 10.7 MHz, then down to 455 kHz before demodulating). In contrast, the first IF and second IF described herein typically refer to alternative configurations of the IF, and may be referred to as "first configuration" and "second configuration".

Thus, the methods described herein may also include switching in the first receiving path from a first filter configured to operate at the first intermediate frequency to a second filter configured to operate at the second intermediate frequency.

Interference in the RF band at a particular frequency (or frequency range) such as the half-IF1 or half-IF2 frequencies, may be determined in any appropriate manner. For example, determining the interference in the RF signal at a first predetermined frequency (including but not limited to the half-IF1 frequency) may comprise determining an error rate at the first predetermined frequency. In some variations, the interference may be determined based on the signal strength (e.g., energy) at the frequency or range of frequencies, and particularly the non-signal energy at those frequencies.

Any of the methods of controlling reception for a wireless broadband radio by selecting between a plurality of intermediate frequencies (IFs) to minimize a predetermined frequency interference may include all or some of the steps such as: receiving a radio frequency (RF) signal having a frequency $f_{sg}$ in a first receive path having a mixer for generating an intermediate frequency (IF) signal from the RF signal by mixing the RF signal with a local oscillation (LO) signal having a local oscillation frequency $f_{LO}$; wherein the intermediate frequency is initially set to a first intermediate frequency, $f_{IF1}$; determining an interference in the RF signal at a first predetermined frequency; determining an interference in the RF signal at a second predetermined frequency; and switching the intermediate frequency to the second intermediate frequency and generating the IF signal from the RF signal at the second intermediate frequency if the interference in the RF signal at the first predetermined frequency exceeds the interference in the RF signal at the second predetermined frequency by a threshold amount. As mentioned, the first predetermined frequency may be any appropriate predetermined spurious interferer frequency, including (but not limited to) the half-IF frequency; for example, the first predetermined frequency may be one-half of $f_{IF1}$ (a half-IF1 frequency), and the second predetermined frequency may be one-half of a second intermediate frequency, $f_{IF2}$ (a half-IF2 frequency).

As mentioned above, determining an interference in the RF signal at the first predetermined frequency and determining the interference in the RF signal at the second predetermined frequency may include monitoring a band including the RF frequency, the first predetermined frequency and the second predetermined frequency on a second receive path that is independent of the first receive path.

As mentioned above and in general, switching the IF frequency may also include adjusting the local oscillator based on the new IF. For example, generating the IF signal at the second intermediate frequency comprises modifying $f_{LO}$ to shift the IF to $f_{IF2}$.

Any of the methods and apparatuses described herein may be configured for operation with a second (e.g., monitoring) receiver that is also connected to the same receiving antenna as the first receiver. For example, the method of operation may also include receiving the RF signal in a wireless broadband radio comprising a first receiver having the first receive path and a second receiver having a second receive path, wherein the first and second receivers are both coupled to the same receiving antenna configured to receive an RF band. The second receiver may be a monitoring receiver configured to scan the band for interference independently of the first receiver. Either or both the first and second receivers may be 802.11 receivers. Switching the intermediate frequency to a second intermediate frequency may further comprise receiving the RF signal in a second receive path while switching the IF to $f_{IF2}$ to prevent an interruption in data traffic during switching. Further, determining the interference in the RF signal at the predetermined frequency may comprises monitoring a band including the RF frequency and the predetermined frequency on a second receive path that is independent of the first receive path.

Switching may comprise switching the intermediate frequency to the second intermediate frequency and generating the IF signal from the RF signal at the second intermediate frequency if the interference in the RF signal at the first predetermined frequency is greater than the interference in the RF signal at the second predetermined frequency by any amount; however, in some variations if the interference in the RF signal at the half-IF1 is the same (or approximately the same) as the interference at the second predetermined frequency, then the method or any of the apparatuses implementing the method may remain at IF2, and not switch.

As already described, switching may comprise switching the intermediate frequency to the second intermediate frequency and generating the IF signal from the RF signal at the second intermediate frequency if the interference in the RF signal at the first predetermined frequency is greater than the interference in the RF signal at the second predetermined frequency by some predetermined amount (e.g., about 10 dB).

Any of the methods (and/or apparatuses for implementing them) described herein may also include switching the intermediate frequency from the second intermediate frequency back to the first intermediate frequency (or to a third IF) if the interference in the RF signal at the second predetermined frequency exceeds the interference in the RF signal at the first predetermined frequency (or the third frequency) by a second threshold. As before the threshold may be the same as for switching from IF1 to IF2 (including simply that the interference at IF2>interference at IF1).

For example, the method may also include switching the intermediate frequency from the second intermediate frequency back to the first intermediate frequency if the interference in the RF signal at the half-IF2 frequency exceeds the interference in the RF signal at the half-IF1 frequency. As described above, switching the intermediate frequency to the second intermediate frequency may comprise switching the intermediate frequency from the first intermediate frequency to an intermediate frequency that is between about 10 MHz and about 250 MHz from the first intermediate frequency.

Also as mentioned above, in general, the method (or an apparatus implementing the method) may include switching in the first receiving path from a first filter configured to operate at the first intermediate frequency to a second filter configured to operate at the second intermediate frequency. In other variations the same filter (or filter set) may be used with any of the intermediate frequencies selected (e.g., IF1, IF2, etc.).

Also described herein are wireless broadband radio apparatuses adapted to select between a plurality of intermediate frequencies (IFs) to minimize interference (and particularly spurious interference at specific frequencies such as the half-IF interference). For example, an apparatus may include: a receiving antenna; a first receiver coupled to the receiving antenna having a first receiving path for receiving a radio frequency (RF) signal having a frequency $f_{sg}$; a mixer in the first receiving path configured to generate an intermediate frequency (IF) signal from the RF signal by mixing the RF signal with a local oscillation (LO) signal having a local oscillation frequency $f_{LO}$; and a controller configured to determine if an interference in the RF signal at a first predetermined frequency (such as, but not limited to, one-half of $f_{IF1}$, a half-IF1 frequency) exceeds a threshold, and to switch the intermediate frequency to a second intermediate frequency, $f_{IF2}$, if the interference at the first predetermined frequency exceeds the threshold.

The radio frequency (RF) signal may have a frequency $f_{sg}$ within a band (RF band) and the apparatus may further comprise a second receiver coupled to the receiving antenna, the second receiver configured to monitor the band and to scan the band for interference independently of the first receiver.

In some variations the same filter (or filter sets) may be used by the receiver for both IF1 and IF2; in other variations different filters (or filter sets) may be used depending on the IF. For example, the first receiving path may comprise a first filter adapted for use with the first intermediate frequency and a second filter adapted for use with the second intermediate frequency, wherein the controller is further configured to select the first or second filter based on the intermediate frequency.

Any of the apparatuses described herein may be configured to also transmit and may therefore include one or more (preferably 2) transmitters coupled to a transmit antenna.

In general, the controller (which may also be referred to as a processor, control processor or control block) may be configured to set $f_{LO}$ based on the intermediate frequency, as mentioned above. The controller may be configured to switch the intermediate frequency to the second intermediate frequency, $f_{IF2}$, if the interference at the first predetermined frequency is greater than an interference at the second predetermined frequency. The controller may be configured to switch the intermediate frequency to the second intermediate frequency, $f_{IF2}$ if the interference at the first predetermined frequency is greater than interference at a second predetermined frequency by some threshold value (e.g., 10 dB higher than interference at a second predetermined frequency).

As mentioned, the second intermediate frequency may be slightly offset relative to the first IF. For example, the second IF may be between about 10 MHz and about 250 MHz (about 20 MHz and about 200 MHz, about 40 MHz and about 150 MHz, etc.) from the first intermediate frequency.

The first (and in some variations, the second) receiver may be a 802.11 receiver.

Any of the apparatuses may also include a second receiver coupled to receive input from the first antenna, wherein the controller is configured to process received RF signals using the second receiver while switching the intermediate frequency to fir to prevent an interruption in data traffic during switching.

As mentioned, the controller may be configured to determine if the interference in the RF signal at a first predetermined frequency (such as the half-IF1 frequency) exceeds the threshold by comparing the interference in the RF signal at the first predetermined frequency with an interference in the RF signal at a second predetermined frequency (e.g., in some variations one-half of fin, a half-IF2 frequency). The controller may be configured to determine if the interference in the RF signal at the first predetermined frequency exceeds the threshold by comparing an error rate at the second predetermined frequency with the threshold. In any of these variations, the threshold may not depend on the error rate at a second (or other) frequency, but may be based on an absolute threshold level.

Also described herein are wireless broadband radio apparatuses adapted to select between a plurality of intermediate frequencies (IFs) to minimize interference, the apparatus comprising: a receiving antenna; a first receiver coupled to the receiving antenna having a first receiving path configured to receive a radio frequency (RF) signal having a frequency fsg within a band; a second receiver coupled to the receiving antenna configured to monitor the band and to scan the band for interference independently of the first receiver; a mixer in the first receiving path configured to generate an intermediate frequency (IF) signal from the RF signal by mixing the RF signal with a local oscillation (LO) signal having a local oscillation frequency $f_{LO}$; a controller configured to receive input from the second receiver to determine if an interference in the RF signal at a first predetermined frequency (e.g., one-half of $f_{IF1}$, a half-IF1 frequency) exceeds a threshold, and to switch the intermediate frequency to a second intermediate frequency, $f_{IF2}$, when the interference in the RF signal at the first predetermined frequency exceeds the threshold.

In some variations, the first receiving path may comprises a first filter adapted for use with the first intermediate frequency and a second filter adapted for use with the second intermediate frequency, wherein the controller is further configured to select the first or second filter based on the intermediate frequency.

BRIEF DESCRIPTION OF THE DRAWINGS

FIG. 2A is schematic diagrams showing one variation of a wireless broadband radio apparatus adapted to select between a plurality of intermediate frequencies (IFs) to minimize interference, as described herein.

FIGS. 2B and 2C show variations of wireless broadband radio apparatuses adapted to select between a plurality of intermediate frequencies (IFs) to minimize interference; FIG. 2B shows a device having two antenna; in FIG. 2C, the device has two parabolic antenna.

In FIG. 4, the first receiving path (in the primary receiver) includes two filter sets; a first filter is matched to the first IF, and the second filter is matched to the second IF. Switching between the first and second IFs will also switch the first receiver between the appropriate filters to match the IF.

In FIG. 6A the apparatus includes a secondary radio receiver that is adapted to monitor the RF band of interest. In FIG. 6B, the secondary radio receiver may also be configured to act as a receiver for receiving wireless data when the first receiver is switching or otherwise not available.

DETAILED DESCRIPTION

In general described herein are wireless radio apparatuses that include a first (primary) receiver and a second (secondary) receiver that are connected in parallel, for example, to the same receiving antenna. The primary receiver may be a high-selectivity receiver, and may be configured to receive radio-frequency signals within an operating frequency band. The second receiver may be configured as a spectrum analyzer, that analyzes all or a portion (e.g., at predetermined frequency locations) of the operating band. The secondary receiver typically operates simultaneously with the first receiver, and may operate continuously or periodically (e.g., at regular intervals) to scan the operating band or predetermined portions of the operating band. The second receiver may be controlled by a secondary processor, which may be configured as a spectrum processor for controlling operation of the secondary receiver as a spectrum analyzer.

Figure 1B:
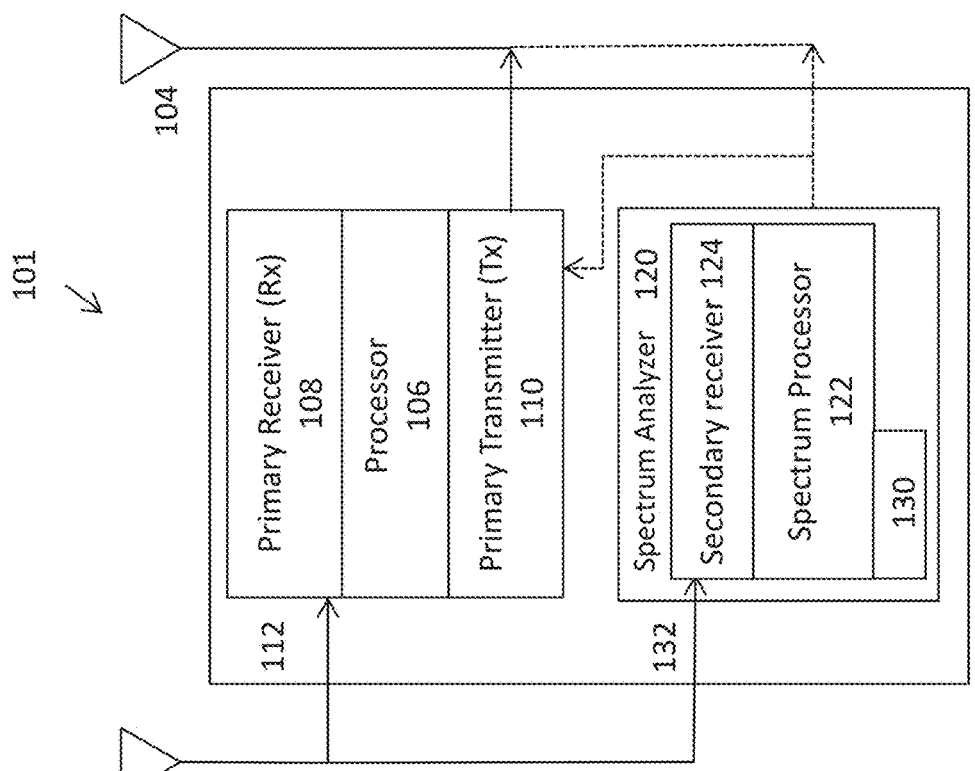
FIG. 1B schematically illustrates another example of a device having an integrated spectrum analyzer for independently and continuously monitoring the operating band.
Figure 1A:
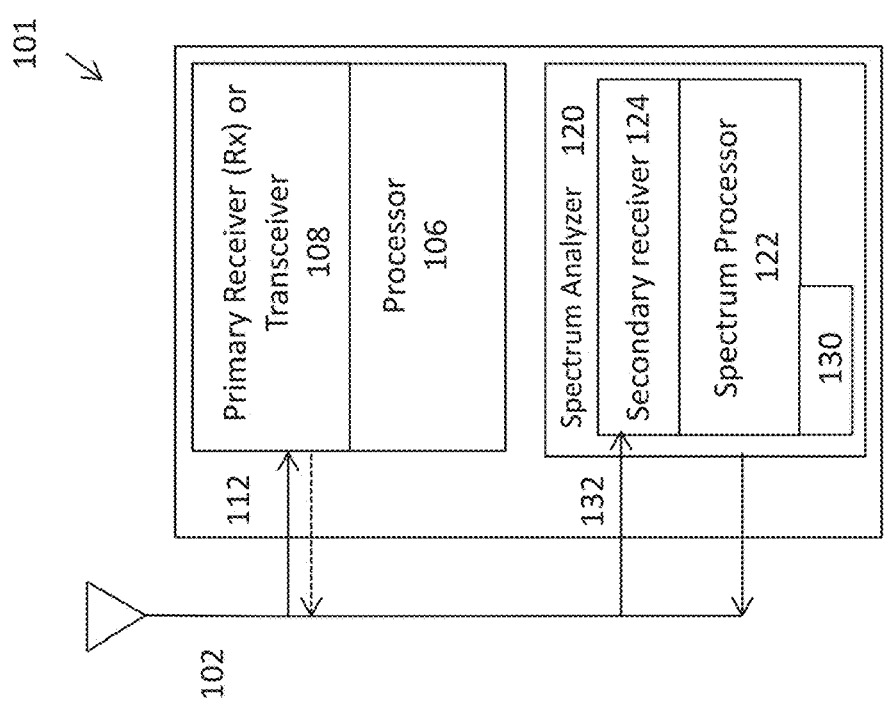
FIG. 1A schematically illustrates one example of a device having an integrated spectrum analyzer for independently and continuously monitoring the operating band.

For example, FIGS. 1A and 1B schematically illustrate two generic variations of devices that include a primary receiver (or a receiver portion of a transmitter) that is used to receive wireless data and operates at one or more frequency channels within an operating band; these devices also include a secondary receiver that, in conjunction with a secondary processor, simultaneously scans the frequency spectrum of the operating band.

In FIG. 1A, the device 101 includes an antenna 102 to which a primary receiver 108 is connected via a receiving path (line 112). The primary receiver 108 is connected to (and may be controlled by) a primary processor 106 or controller. In some variations the receiver is part of a transceiver. In some variations (not shown) a separate transmitter may be connected to the processor 106 and/or the antenna 102. This 'primary' pathway may operate to wirelessly communicate with one or more other devices and typically transmits and receives radio-frequency information using one or more channels that are part of an operating frequency band. In this example, a secondary receiver 124 is connected in parallel with the primary receiver 108 to the same antenna 102 which is also connected to a secondary processor 122. In some variations a separate antenna may be used. In FIG. 1A, the secondary receiver 124 is configured as a spectrum analyzer 120, and the secondary processor 122 is configured as a spectrum processor 122. The spectrum processor can control the spectrum analyzer 120 and process spectrum information about the frequency band (or specific, predetermined sub-portions of the frequency band). In particular, the spectrum analyzers (e.g., the spectrum processor portion of the spectrum analyzer) may store (e.g., in a memory 130), analyze, encode, and/or transmit the spectrum information.

For example, a spectrum processor may cause the secondary receiver to scan through the operating band (frequency band) collecting frequency spectrum information, including process frequency information at specific predetermined frequencies. In FIG. 1A the spectrum information (encoded or otherwise) may be transmitted (e.g., using the shared antenna 102 or a dedicated spectrum analyzer antenna or another secondary antenna), stored, presented (e.g., displayed) or analyzed.

In use, there are many functions that may be performed by apparatuses including a primary receiver and a secondary receiver adapted to analyze the local frequency spectrum of the apparatus. In some examples, such an apparatus may be used for simultaneously communicating wirelessly (e.g., via the primary receiver, a primary transmitter and/or a primary transceiver) and monitoring the local frequency spectrum over the operating band. The frequency information may be collected, analyzed, stored and/or transmitted. Spectrum information (data) from the spectrum analyzer may be processed by filtering or the like. A spectrum analyzer may process signals continuously, e.g., without consideration of protocol preambles or data coding as would be used in the primary receiver. Thus packet detection is not required. Frequency domain information may describe power versus frequency for the real and imaginary component.

Spectrum information may be encoded with additional information such as one or more of: temporal information (date/time the frequency information was collected), location/position information (e.g., GPS information locating the device geographically), orientation information (e.g., direction orientation), device-identifying information (unique identifiers for a particular device, information about the make/model of the device, lot number, etc.), or the like.

Any of the frequency information (including encoded information) may be stored and/or transmitted. For example, in FIG. 1A, the spectrum analyzer is shown connected to the antenna so that it can be transmitted.

FIG. 1B is another example of a device including a spectrum analyzer 120 connected in parallel to a primary receiver 108. In this example, the primary receiver is also connected to a processor 106 along with a primary transmitter 110. A second antenna 104 is used to transmit, while a receiving antenna 102 is used for receiving wireless radio-frequency information. In FIG. 1B, the same device may be transmitting and receiving simultaneously, and at the same time monitoring (using the spectrum analyzer 120) the frequency spectrum of the operating band.

In both FIG. 1A and FIG. 1B, the spectrum analyzers may wirelessly transmit spectrum information (encoded or not). The spectrum information may be transmitted by primary transmitter and/or directly by the antenna (e.g., in FIG. 1B, the transmission antenna), as indicated by the dashed lines in FIG. 1B.

As mentioned above, described herein are radio devices that include at least two sets of radio receivers, where the first (primary) one of the receivers may be configured to act as a wireless radio for receiving data and the second receiver may be adapted to do persistent spectrum analysis of the band that the first receiver is operating in. In some variations, the device may modify the first receiver based on information from spectrum analysis. In some variations, the device does not modify the first receiver based on information from the spectrum analysis. The device may be adapted to transmit information about the local radio frequency (RF) environment from the spectrum analyzer and report this information to an aggregator (e.g., a remote processor/server) that can combine this information with other frequency spectrum information from other locations (or overlapping locations). This collected information may be used to optimize the network frequency channel planning, for example.

Figure 1C:
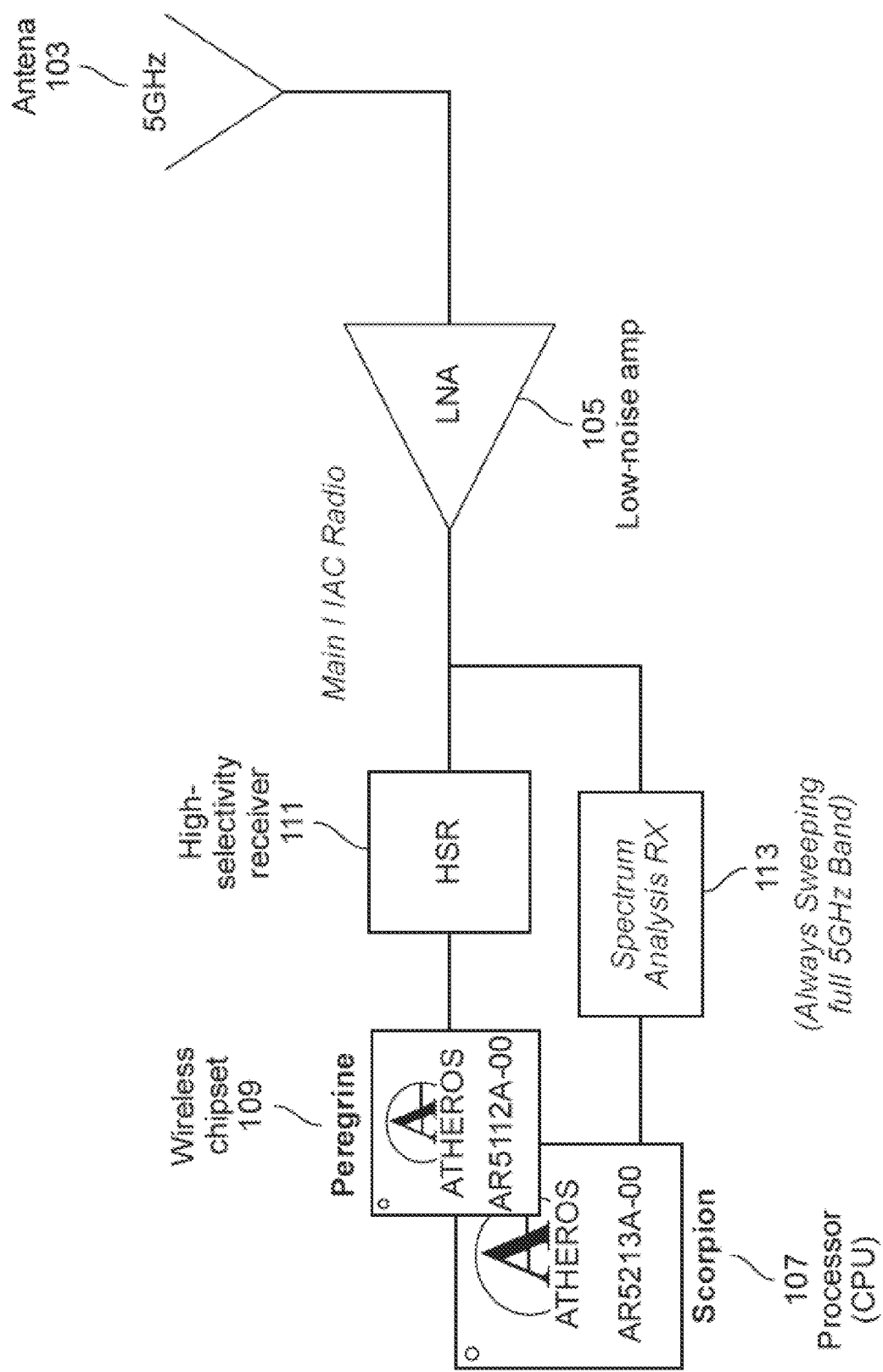
FIG. 1C is a schematic illustration of a wireless radio device including a persistent spectrum analyzer operating in parallel with a high-selectivity receiver.

Thus, described herein are apparatuses and methods that use a secondary receiver set, which may be independent of the first receiver set and may be connected to the same receiving antenna or may have a separate antenna, and is configured as a spectrum analyzer. In the example, shown in FIG. 1C, a radio device that is configured as an 802.11 device operating in the 5 GHz band and includes pair of receivers 111, 113. One of the receivers is adapted as a spectrum analysis receiver that is continuously sweeping the full 5 GHz band. In FIG. 1C, both receivers are connected to the same front-end, including an antenna adapted to receive in the 5 GHz band 103 and pre-filtering, such as a low-noise amplifier 105. The first receiver 111 is a high-selectivity receiver (HSR) for processing data within the 5 GHz band. In parallel with the high-selectivity receiver 111, a second receiver 113 operates as a spectrum analyzer to monitor the 5 GHz band used by the first receiver 111. A wireless chipset 109 and processor 107 may be used by either or both receivers. For example, an 802.11(n) 5 GHz radio may be used as a spectrum analyzer along with another (data) receiver (primary receiver 111) as part of an 802.11ac radio. The 802.11(n) receiver may perform persistent spectrum analysis in the background as the other receiver receives data.

The spectrum information may be used to modify or adjust the operation of a network that includes one or more of the devices described above. In particular, similar devices may all report back to a processor (aggregator) that can monitor the overall RF environment status of a network or of multiple networks. This information may be used, for example, to optimize network, by optimizing frequency channel planning or other means, or for optimizing the positioning or operation of individual devices within the network.

In some variations, the devices having a primary receiver that is used to receive wireless data and a secondary receiver connected in parallel with the primary receiver that can act as part of a spectrum analyzer may be configured to optimize performance of the primary receiver by monitoring specific frequencies in the frequency spectrum using the secondary receiver operating as a frequency analyzer in order to avoid interferers. For example, described herein are methods and apparatuses that minimize interference by selecting between a plurality of intermediate frequencies (IFs) using the secondary receiver to control selection. In particular, the methods and apparatuses described herein may be useful to reduce or eliminate the problem of spurious interferers.

Spurious interferes may be at specific. e.g., predetermined, frequencies. For example, the spurious interferer may be half-IF interferences. Any of the apparatuses or methods described herein may utilize two (or more) receivers that both (or all) receive input from a single receiving antenna. These receivers may be independent of each other. In some variations the receivers may be configured nearly identically. In some variations the receivers may be configured to act redundantly. In some variations one of the receivers may be a primary receiver and one may be a secondary receiver. The secondary receiver may be configured as a monitor, to monitor the desired band of the RF signals (including monitoring as a spectrum analyzer).

As used herein the desired band may refer to the frequency band or spectrum where the specified service is permitted to operate. For example, for IEEE 802.11b systems, the "desired band" spectrum is the spectrum encompassing channels permitted by the IEEE 802.11b radio standard. For the U.S. this spectrum includes the 11 channels located within the band 2412 MHz to 2462 MHz. IEEE 802.11 systems may also operate in other bands such as 5.0 GHz frequency band. The desired band spectrum is also referred to as the in-band spectrum. A filter that filters the desired band spectrum may be referred to as a "band select filter". "Frequency band" or "frequency spectrum" may be used interchangeable, and these terms may also have the same meaning as the term "band" or "spectrum". The phrase out-of-band spectrum may refer to the frequency band or spectrum outside of the desired band spectrum. For IEEE 802.11b systems operating in the 2.4 GHz band, the "out-of-band" spectrum encompasses frequencies outside of the 2.4 GHz frequency range. A typical out-of-band filter may filter frequencies outside the frequency band of 2400 MHz and 2484 MHz.

The phrase "desired channel" may refer to the frequency band or spectrum within the desired band spectrum where a specific channel may operate. For IEEE 802.11n systems, the desired channel bandwidth may be 5, 10, 20, or 40 MHz. A filter that selects the desired channel bandwidth may be referred to as a "channel select filter". For IEEE 802.11b systems operating in the 2.4 GHz band, the channel assignments are within the 2412 MHz to 2462 MHz frequency range and the channel bandwidth may be 5, 10, 20 or 40 MHz. The term "radio signal" may refer to the radio frequency signal received by the antenna of a radio receiver. The radio signal may comprise the information signal and the interferer signals. The phrase "RF signal" may refer to a signal operating at radio frequencies. An RF signal may be the radio signal or may be a signal located in the high selectivity RF circuit. An "information signal" may refer to the portion of the RF signal that comprises the desired signal or information to be received. An "interferer signals" may refer to the portion of an RF signal that does not comprise any components of the information signal. The interferer signals may be desired band (in-band) or out-of-band. Desired band interferer signals may be located within a desired channel band, or may be located adjacent to a desired channel band. A strong interferer signal typically has a signal strength that is greater than the information signal, and a lesser interferer has a signal strength that is less than the information signal. IEEE 802.11 refers to the following standards: IEEE 802.11n (2.4 GHz and 5 GHz bands), IEEE 802.11b (2.4 GHz band), IEEE 802.11g (2.4 GHz band), and IEEE 802.11a (5 GHz band). There is also a public safety band available in the U.S. operating with a 4.9 GHz band. Refer to appropriate IEEE standard for further details. For example, IEEE Std 802.11-2007.

A superheterodyne (or "superhet") architecture in a radio receiver may provide superior performance, especially to address adjacent channel interference (ACI). Heterodyne means to mix two frequencies together to produce a beat frequency, or the difference between the two frequencies. Amplitude modulation is an example of a heterodyne process where the information signal is mixed with the carrier to produce side bands. Side-bands occur at precisely the sum and difference frequencies (beat frequencies) of the carrier and the information signal. Normally the beat frequency associated with the lower side band is utilized in the radio system. The center frequency of the lower side-band is the intermediate frequency (IF).

When a radio system utilizes the lower side-band, a superheterodyne process is implemented. That is, the term superheterodyne may refer to creating a heat frequency that is lower than the original signal. Hence, superheterodying mixes another frequency with the carrier frequency of the information signal so as to reduce the signal frequency prior to processing.

As an example, for IEEE 802.11b systems, the received carrier frequencies include channels in the frequency band from 2412 MHz to 2462 MHz. Hence, a received signal with a carrier of 2412 MHz may be mixed with a synthesized reference clock of 2038 MHz to generate an IF of 374 MHz.

One advantage of superheterodyning is an improvement in signal isolation by arithmetic selectivity, i.e., increasing the fractional bandwidth. This is the bandwidth of a device divided by its center frequency. For example, a device that has a bandwidth of 2 MHz with center frequency 10 MHz may have a fractional bandwidth of $2/10$, or 20%.

The ability to isolate signals, or reject unwanted ones, is a result of the receiver bandwidth. For example, the band-pass filter in the tuner is what isolates the desired signal from the adjacent ones. In reality, there are frequently sources that may interfere with the radio signal. The FCC makes frequency assignments that generally prevent this situation. Depending on the application, one might have a need for very narrow signal isolation. If the performance of your band-pass filter isn't sufficient to accomplish this, the performance may be improved by superheterodyning.

As discussed above in the background section, one undesirable consequence of signal processing such as superheterodyning is the half-IF spurious response, which has proven particularly difficult to ameliorate. The general description of where this spurious signal occurs is "half way between the desired Rx signal and the LO frequency", or "half of the IF frequency offset from the desired Rx signal, in the direction of the Local Oscillator frequency".

Assuming "low side injection" where the LO frequency is below the Rx (receiver) frequency, a desired Rx frequency of 5800 MHz. and an IF frequency of 1200 MHz, the half-IF vulnerability would be at 5200 MHz (5800–½ 1200). As discussed above, this is essentially another undesirable mixing product in the mixer. Two times the ½ IF frequency mixed with two times the local oscillator frequency results in the same IF output frequency.

The traditional method of mitigating the half-IF vulnerability is to use a filter to significantly attenuate Rx signals at this vulnerable frequency. This can be expensive, and can also limit the frequency coverage range of a receiver to the point that it is undesirable. Assuming even ideal filters, this traditional method would limit the frequency coverage to slightly less than one half of the IF frequency. So a receiver designed to receive 5.9 GHz as its upper frequency limit with a 1.2 GHz IF could not be expected to perform below 5.3 GHz because the ½ IF vulnerability at 5.3 GHz when receiving 5.9 GHz would not be attenuated at all. The interference at that frequency would have the full gain/response of the receiver and the only rejection would be that inherent in the down converting mixer. Further, since ideal band pass filters are not available, this frequency coverage range limitation in practice is more severe; the pass band of the filter must be reduced to allow some acceptable level of attenuation at these half-IF frequency offsets from the pass band.

The proposed methods and apparatuses described herein are a compromise between the strict traditional method relying strictly on filtering, and one that assumes that while interference can be debilitating, the probability of having significant interference at more than one "half-IF" type frequency offset at the same time is unlikely. This method does not eliminate the expectation of brute force filtering of the IF frequency, but may lessen the impact if interference is experienced due to insufficient filtering.

In general described herein are methods and apparatus using an "agile" IF frequency that may be shifted or changed. The IF frequency may be continuously tuned in some variations, or two or more discrete IF frequencies may be chosen and selected between; IF frequencies maybe selected based on the availability of filters so that if interference is experienced when using one IF configuration, the configuration can be changed and the probability of equal interference at the new vulnerable frequency would be low.

The switching of the IF in the apparatus and methods as described herein may be guided by an analysis of the band of interest. This analysis may be performed concurrently with the reception of the RF signal(s), and may be ongoing. In particular, the systems described herein may include a second, independent, receiver that is adapted to monitor the desired band. For example, FIGS. 2A-2C illustrate different variations of apparatuses that include a separate receiver. FIG. 2A shows an overall schematic illustration of an apparatus having a single receiving antenna 202 and two (or more) independent receivers 208, 208'. Each receiver may have one or more receiving chains. In FIG. 2A, the apparatus also includes a transmitting antenna 204 and a plurality of transmitters 210, 210' (which may also be independent). A controller/processor 206 may be included. The controller/processor may be configured to switch the IF based on information about the interference at particular frequencies (e.g., half-IF frequencies).

FIGS. 2B and 2C illustrate wireless broadband radio apparatuses that may be adapted to select between a plurality of intermediate frequencies (IFs) to minimize spurious interference. FIG. 2B shows the outside of an apparatus having two antennas; this variation the apparatus is a 5 GHz (or alternatively a 2.4 GHz) RF radio with two external antennas that supports 802.11n MIMO. In the variation shown in FIG. 2C the apparatus includes two parabolic antennas; a cover (radome) has been removed to show the two antennas 202, 204. In this example, the apparatus is configured as a 5 GHz apparatus that includes a transmit antenna 204 and a receive antenna 202. The receive antenna is connected directly to two receivers (receiver circuitry). The first receiver is a primary receiver and the second receiver is a secondary, or monitoring, receiver. A processor/controller is also included and may communicate with both. The processor/controller may decide, based on information provided by the monitoring receiver about interference at specific frequencies, which may be known a priori or determined on the fly, whether to switch the IF of the apparatus when receiving information (data) from the receive antenna. The frequency (or in some variations frequencies) of the spurious interferer may be provided to the processor/controller (and thus be predetermined). For example, the monitoring receiver may determine the frequency of a spurious interferer at a first and/or second predetermined frequency location. For example, the monitoring receiver may determine the interference at each of the half-IF frequencies for a first IF (IF1, which can also be denoted herein as $f_{IF1}$) and a second IF (IF2, which can also be denoted herein as $f_{IF2}$), and this information may be sent to the processor/controller to determine if the IF should be switched from the first IF (IF1) to the second IF (IF2), for example, if the interference at the half-IF2 is less than the interference at the half-IF1 frequency.

Figure 3:
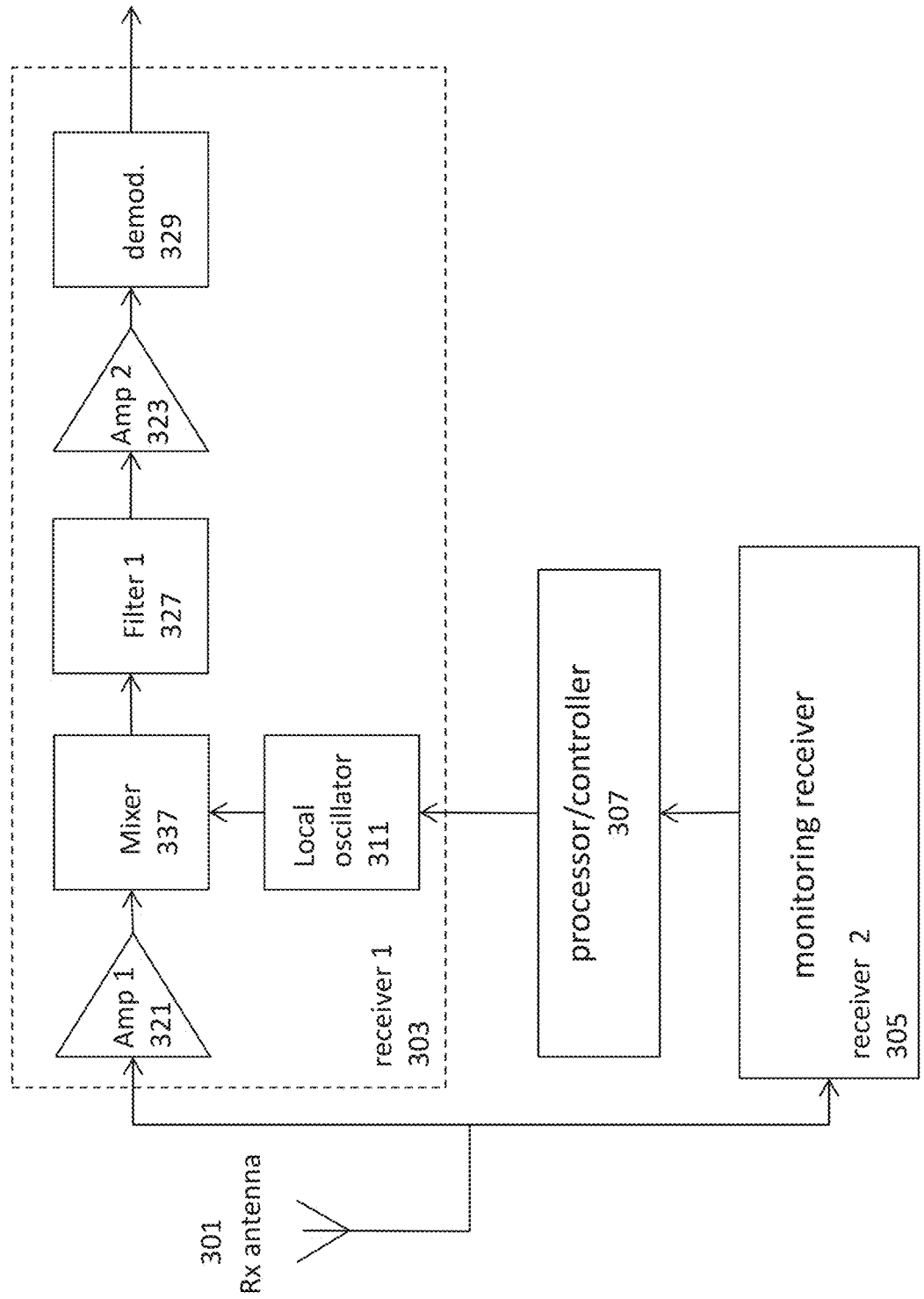
FIG. 3 is a schematic illustrating one variation of a wireless broadband radio apparatus adapted to select between a plurality of intermediate frequencies (IFs) to minimize interference, including a primary receiver (having a receiving path) and a secondary or monitoring receiver, with both primary and secondary receivers connected to the same receiving antenna.

FIG. 3 illustrates one variation of an apparatus configured to switch or adjust IFs in order to avoid or minimize interferers in a desired RF band, and particularly half-IF interference. In FIG. 3, the apparatus includes a single receive antenna 301 that is connected to each of two receivers, including a first receiver 303 and a second receiver 305, configured as a monitoring receiver. The apparatus also includes a processor or controller (processor/controller) 307. In this example, the apparatus may analyze, in real time, the RF band using the monitoring receiver 305. The processor/controller 307, which may be part of a more general processor and/or controller and encompasses both hardware, software and firmware, may determine if the IF should be switched based on the interference in the band. For example, the controller/processor may determine that there is more interference (e.g., a strong interferer) near the half-IF frequency at a first IF (IF1) compared to the interference at a half-IF (IF2) frequency and therefore the apparatus may switch the IF from IF1 to IF2 (or vice versa, depending on the interference profile). In general, the processor/controller 307 may switch the intermediate frequency (IF) based on the interference profile of the band, including specifically the half-IF frequencies. The interference profile may include the time duration, frequency (duty cycle/rate of occurrence), etc. The processor/controller 307 may be configured to adjust the IF, and may also adjust the local oscillator to accommodate the new IF. Thus, the local oscillator 311 may be a programmable local oscillator that is configured to provide an appropriate LO based on the radio (receiver) tuning and on the set IF.

The first receiver 303 in FIG. 3 may be generally set up as a superheterodyne receiver, and may include typical components, including amplification 321, 323, filtering 327, a demodulator 329, and any other component as appropriate. In FIG. 3, the filter(s) 327 may be chosen as appropriate over a range of IFs, such as IF1 and IF2, so that if the processor/controller switches the IF based on a detected interference (e.g., a half-IF interference), the same filter(s) may be used. In other variations, as described in FIG. 4, the filter (filter sets) may be switched as the IF is switched. The first receiver may be connected to, and may receive input from, the processor/controller 307, to switch the IF, including adjusting the IF and adjusting the LO (programmable and/or adjustable LO 311).

Figure 4:
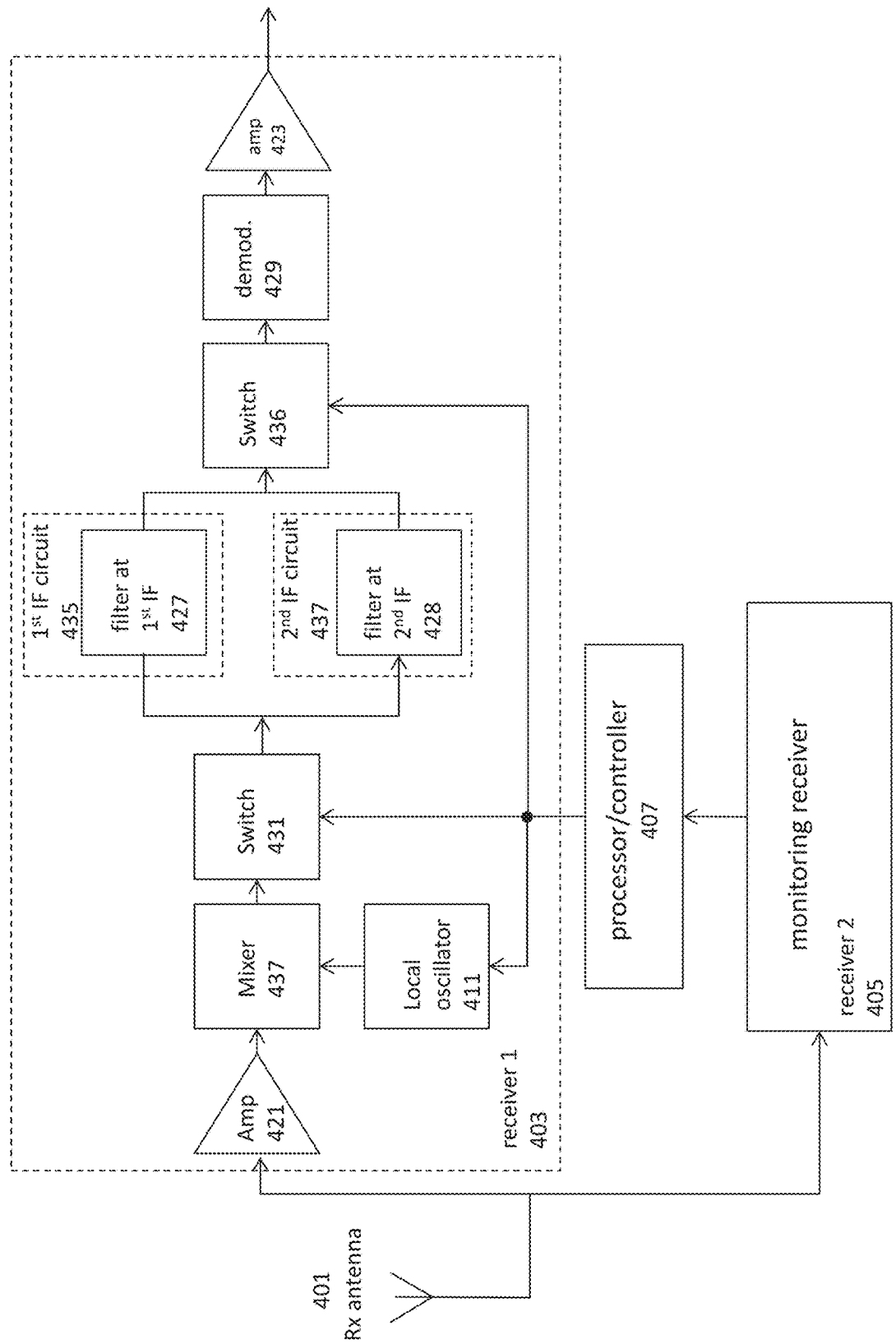
FIG. 4 is a schematic illustration of another variation of a wireless broadband radio apparatus adapted to select between a plurality of intermediate frequencies (IFs) to minimize interference.

FIG. 4 illustrates a schematic of another example of a wireless broadband radio that is adapted to select between a plurality of intermediate frequencies (IFs) to minimize the impact of a spurious interferer frequency (such as a half-IF) interference. In this example, as in FIG. 3, the same antenna (Rx antenna 401) is connected to two receivers. The first ("primary") receiver 403 includes appropriate superheterodyne circuitry (e.g., filters 427, 428, amplification 421, 423, mixer 437, demodulator(s) 429, and local/programmable oscillator 411). As discussed above, the second receiver 405 may scan the band, and may therefore be configured as a monitoring receiver. The monitoring receiver may generally detect interferers, and provide this information (e.g., frequency location) to the processor/controller to modify activity of the radio, for example, by modifying the first receiver. For example, the monitoring receiver 405 may examine the energy at the half-IF frequencies for the various selectable intermediate frequencies (IF1, IF2, etc.), to determine if there is an interferer at these frequencies. The processor/controller may then switch between the possible IFs based on the information provided by the monitoring receiver, and set the IF of the receiver 403 accordingly.

In FIG. 4, the primary receiver 403 may include a receive path that can be switched 431 by the processor/controller 407 depending on the IF. Although in general different IFs may be only slightly shifted relative to each other (e.g., IF2 may be within 20-250 MHz of IF1, or between about 20 MHz to about 150 MHz of IF1, etc.), the filter used by the superheterodyne receiver may be selected based on the IF being used (e.g., IF1, IF2, etc.). Thus, in the receive path, the processor/controller 407 may select between a first IF circuit 435 within the primary receiver, adapted for use when the IF correspond to IF1, and a second IF circuit 437 within the primary receiver, adapted for use when the IF corresponds to IF2. The filters 427, 428 may share a common amp 423 and demodulator 429 in the receive path or the first IF circuit and the second IF circuit may include a specific demodulator and amplifier (not shown) adapted for use at IF1 and IF2, respectively. The processor/controller 407 may switch/select which IF is applied, and which IF circuit to use ($1^{st}$ IF circuit 435 or $2^{nd}$ IF circuit 437), as appropriate.

In operation, the processor/controller 407 may, in an ongoing manner, receive information from the monitoring receiver 405 about the RF band including the signal (region of interest) and any other surrounding regions, and may control the primary receiver (and in some variations, the secondary receiver) in order to avoid interferers that may reduce the effectiveness of the radio. In the examples of FIGS. 3 and 4, the processor/controller 407 may adjust the IF of the radio, including adjusting the local oscillator, filters, and the like, so that the radio switches the intermediate frequency to an intermediate frequency providing enhanced performance, e.g., to avoid interferers such as the half-IF spurious response. Although FIGS. 3 and 4 show only two IFs (IF1 and IF2), three or more IFs may be used, and selected between by the processor/controller in the same manner. Additional circuitry (e.g., filters) appropriate to each IF may be included.

Figure 5:
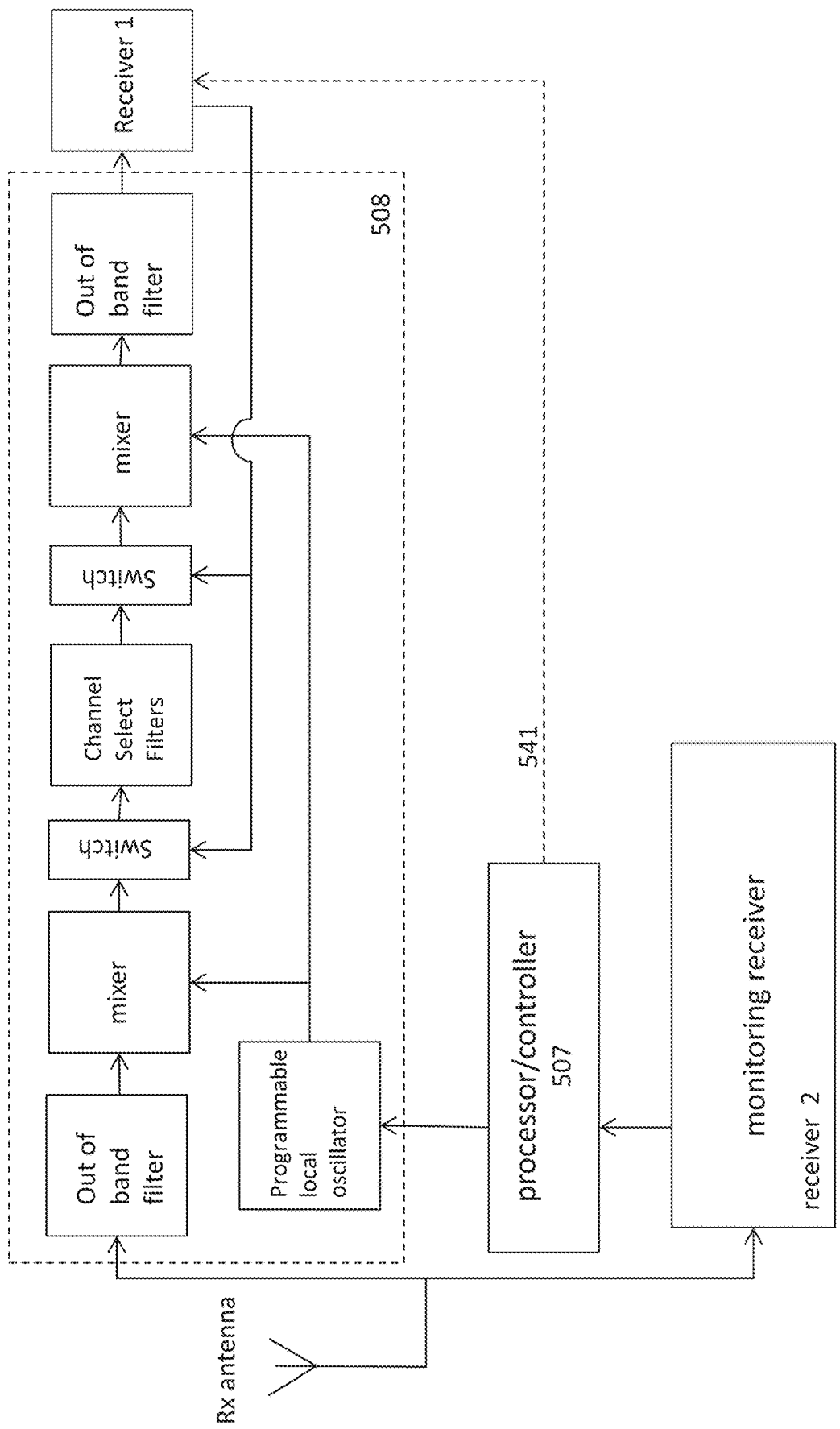
FIG. 5 illustrates another schematic of a wireless broadband radio apparatus adapted to select between a plurality of intermediate frequencies (IFs) to minimize interference. In this variation the apparatus is also optimized to reduce adjacent channel interference; a high-selectivity RF circuit is coupled between the antenna and a first radio receiver. Either or both the first radio receiver and/or the high-selectivity RF circuit may be adapted as described herein to switch the IF.

In FIGS. 3 and 4, the apparatus adjusts the IF of one (or both in apparatuses in which the secondary receiver may also be used to receive and process data, for example, during switching) of the receivers within the superheterodyne circuitry. In any of these variations, the IF may or alternatively be adjusted in any pre-processing circuits, as described in apparatuses including adjacent channel optimization receivers, as described in U.S. Pat. No. 8,219,059. In these apparatuses, the receiver includes a high-selectivity RF circuit that processes the signal (down-converting, filtering, and up-converting) to remove interferers that are near but not within a desired bandwidth. FIG. 5 illustrates a variation of a high-selectivity circuit 508 that is connected to a second (monitoring) receiver through a processor/controller 507 that can select the IF for the high-selectivity circuit. In some variations the processor/controller may also communicate 541 with the primary receiver and set the IF within the receiver (as shown in FIGS. 3 and 4, above).

Figure 6B:
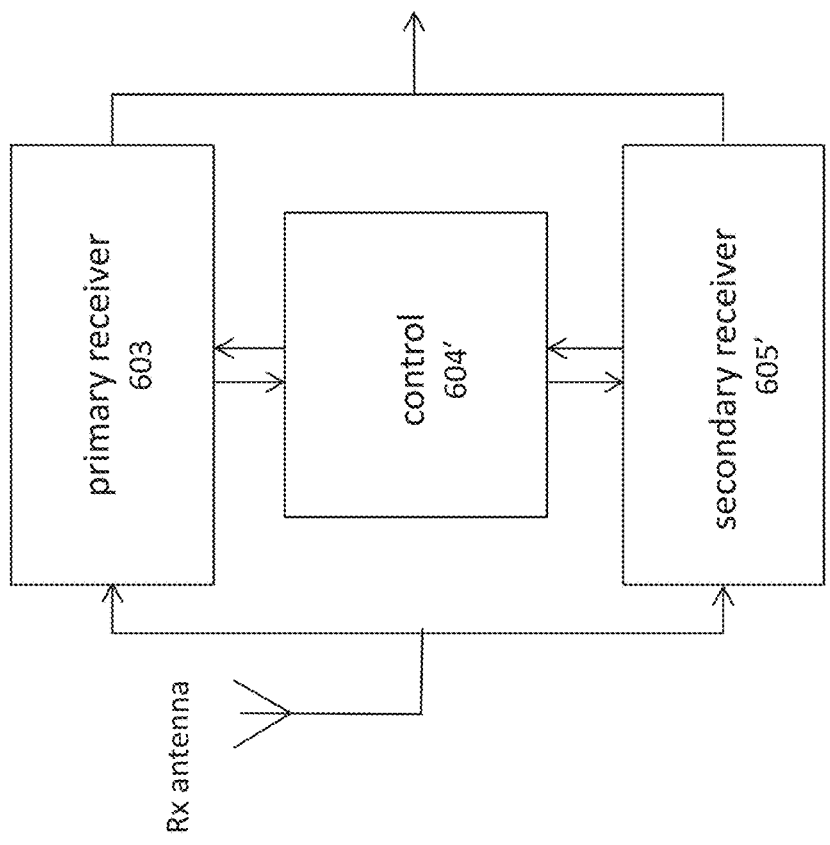
FIGS. 6A and 6B illustrate schematics of wireless broadband radio apparatus adapted to select between a plurality of intermediate frequencies (IFs) to minimize interference.
Figure 6A:
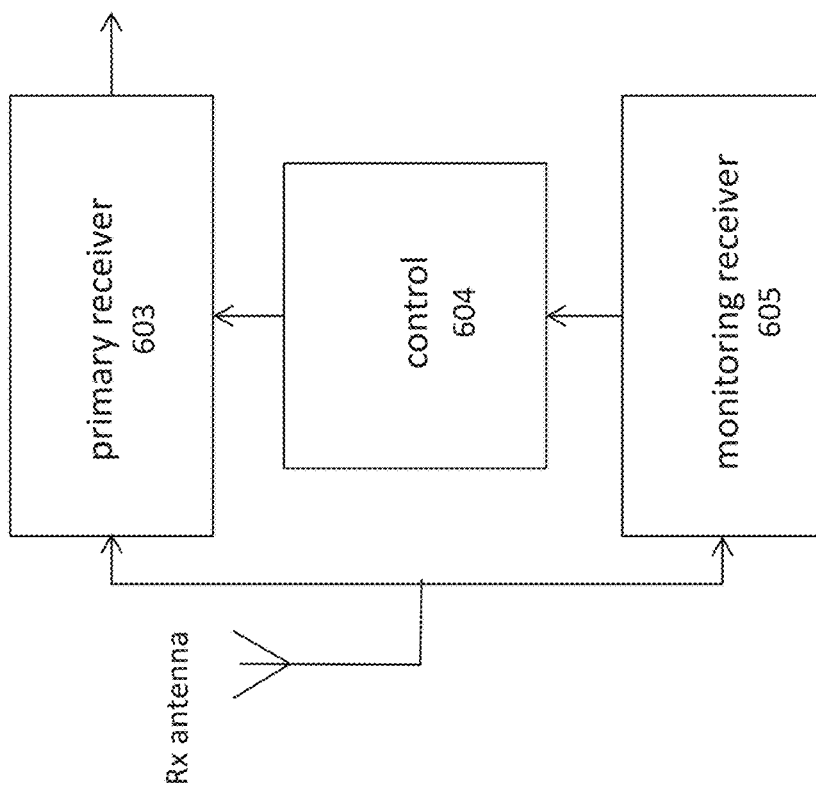

FIGS. 6A and 6B schematically illustrate wireless broadband radios that may select between a plurality of intermediate frequencies (IFs) to minimize a half-IF frequency interference. As mentioned above, any of the apparatuses and methods described herein may include multiple (independent) receivers that communicate with the same receiving antenna. One of these receivers may be designated as a primary receiver and the other as a secondary receiver; in some variations the two receivers may be interchangeable, while in other variations one receiver may be a dedicated monitoring receiver. For example, in FIG. 6A, the primary receiver is configured as an 802.11 receiver, and the secondary receiver is a monitoring receiver. A control (e.g., "processor/controller" or IF controller) 604 receives input from the monitoring receiver 605, and may adjust the primary receiver 603, e.g., selecting the IF of the primary receiver. In the variation shown in FIG. 6B, both the primary receiver 603' and the secondary receiver 605' are be configured as an 802.11 receiver; the control 604' may communicate with both the primary and secondary receiver. The primary and secondary receivers may switch between monitoring and data processing; this switching may be controlled by the controller 603'. In the variation of FIG. 6B, each receiver may be adapted to operate at a slightly different IF (or more than one IF).

Figure 7A:
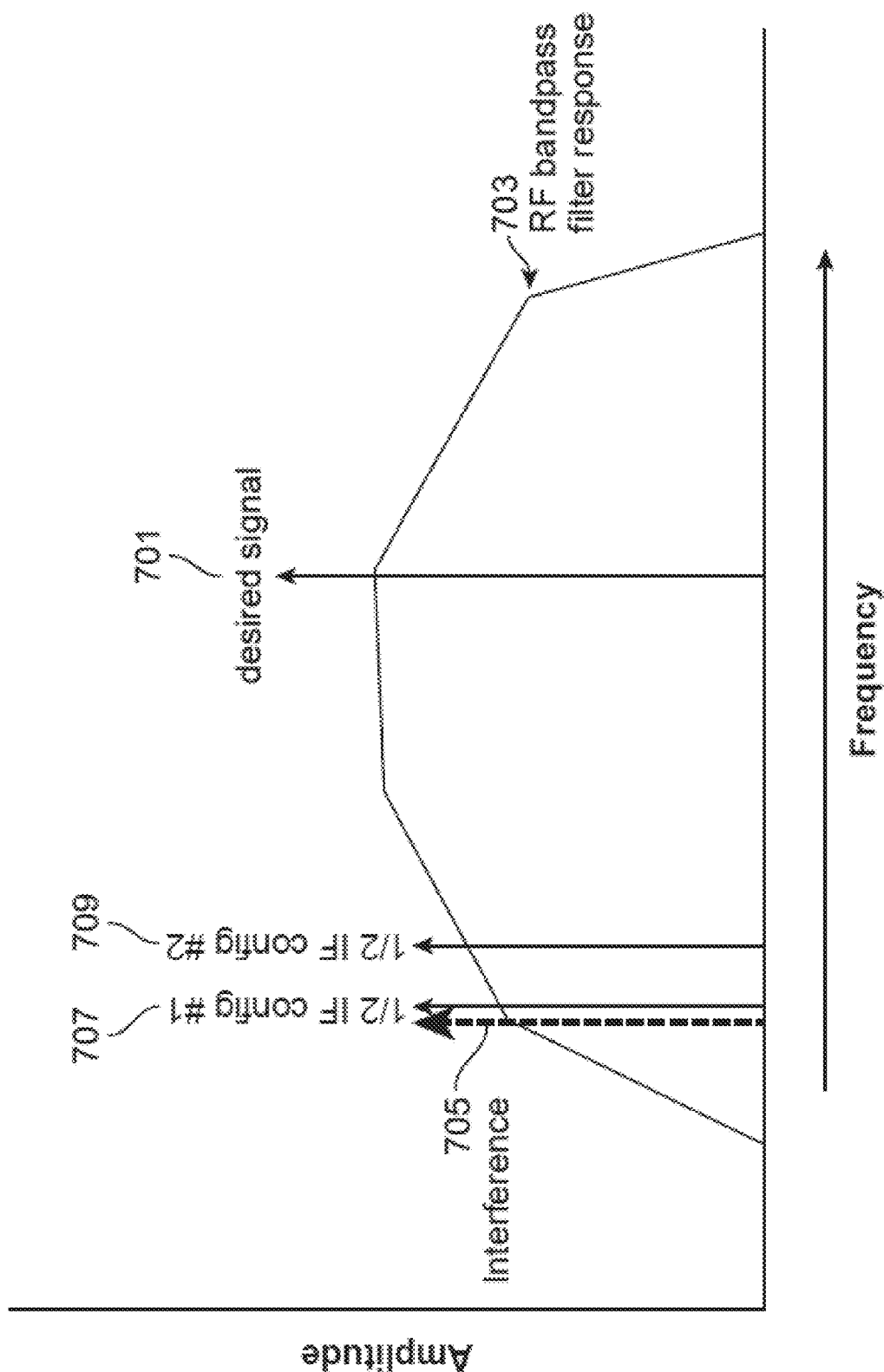
FIG. 7A is a frequency spectrum diagram for a radio channel showing an interferer near two half-IF frequencies for a first IF and a second (or alternate) IF, respectively.

Any of the apparatuses described herein may be configured to reduce or minimize interference by taking advantage of a second receiver that operates in parallel with a primary receiver. By concurrently and actively monitoring the RF band, the second receiver may provide information allowing the apparatus to avoid, minimize or eliminate interferers. In particular, the apparatus may be specifically configured to avoid spurious interferers at the half-IF. This is illustrated, for example, in FIG. 7A. FIG. 7A shows a frequency spectrum diagram including a radio channel of interest. FIG. 7A also indicates the location of the desired signal 701, and the locations of each of two half-IF positions for two different IFs (e.g., configuration #1 at IF and configuration #2 at IF2). Although the desired signal 701 is well-separated from the interferer identified 705, the interferer is very near to the half-IF location of the first configuration (IF1), which would result in a spurious signal due to the half-IF if the first IF (configuration #1) were used. In this example, the band may be monitored as shown in FIG. 7A by a second (e.g., monitoring) receiver that can determine the location of interferers, including monitoring sensitive locations or regions of the spectrum (e.g., ½ IF1, ½ IF2, locations of filters etc.). This information may be passed on to a processor/controller (e.g., IF controller) and used to set or switch the Intermediate Frequency (IF).

In the FIG. 7A, some interference is experienced at the half-IF vulnerability for first configuration (configuration #1) 707. There is some attenuation in the RF band pass filter at this frequency, but not very much. If the IF configuration were changed to the second configuration ("config #2") which corresponds to a half-IF at 709, the interference would be avoided entirely. FIG. 7A indicates the vulnerable frequency ranges 707, 709 for each configuration when configured to receive "desired signal".

Thus, in some variations, a method or apparatus incorporating the method may use two IF frequencies that are relatively close. For example, a first and second IF that are within 250 MHz or less, where filters that provide close-in selectivity are available. The method and/or apparatus may adaptively select between these two IF frequencies to dodge interference. This may not only result in reduced interference susceptibility, but may also offer a wider frequency coverage range without additional substantial filtering requirements, or without needing complex and expensive filters.

In general, the method switches the IF of an apparatus based on the amount of interference in a predetermined location (e.g., at the half-IF). The system actively monitors a frequency region such as the half-IF frequency to determine if there is interference above a threshold and, if so, switches to another IF. In general, a threshold may be a predetermined value, or it may be based on comparison to another region. For example a threshold may be the amount of interference at another frequency region, such as the half-IF at the alternate frequency (IF2). A system may toggle between a first IF (IF1) and a second IF (IF2) by comparing the amount of interference at each of these susceptible frequencies, choosing the IF having less interference at its half-IF frequency.

Figure 7B:
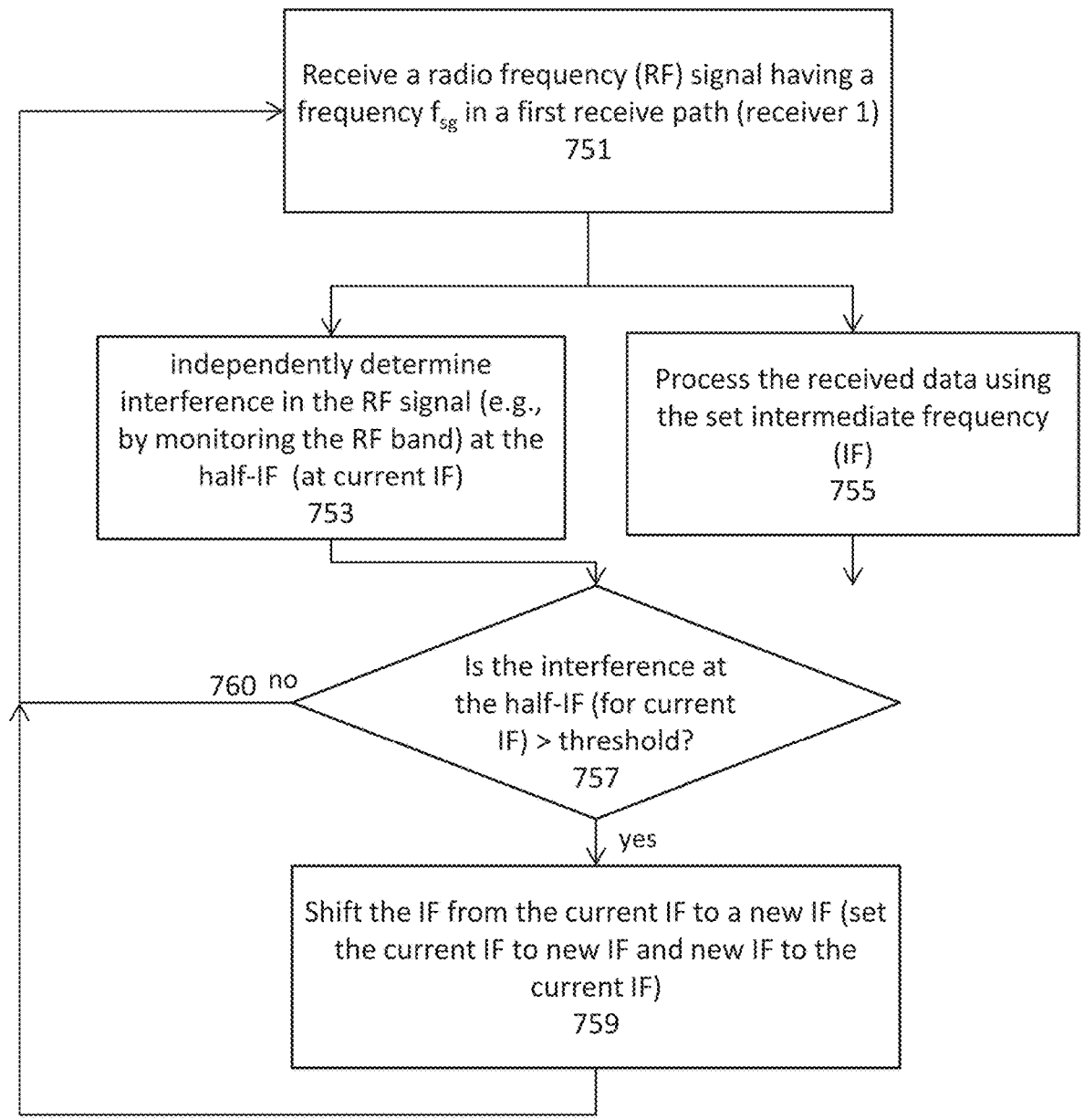
FIG. 7B illustrates a method of controlling reception for a wireless broadband radio by selecting between a plurality of intermediate frequencies (IFs) to minimize a half-IF frequency interference.

FIG. 7B illustrates an example of a method for controlling reception of a wireless broadband radio by selecting between a plurality of intermediate frequencies (IFs) to minimize half-IF frequency interference. In FIG. 7B, the method includes receiving a radio frequency (RF) signal having a frequency $f_{sg}$ in a first receive path 751. The first receive path may have a mixer for generating an intermediate frequency (IF) signal from the RF signal by mixing the RF signal with a local oscillation (LO) signal having a local oscillation frequency $f_{LO}$. The intermediate frequency may be initially set to a first intermediate frequency (IF1), which may be referred to as the "current IF". At the same time that the RF signal is received by the first receive path, a second receiver (connected to the same antenna) may independently determine interference in the RF signal, for example, by monitoring the RF band (spectrum). In particular, the second receiver may monitor the RF band to determine any interference at a frequency that is one-half of IF1/$f_{IF1}$ (a half-IF1 frequency) 753. In some variations the second receiver may also determine the interference at the half-IF frequency for a second (slightly shifted) IF, IF2, which is initially a "new IF". If the interference at the half-IF for the current IF frequency is greater than a threshold 757 (e.g., greater than the interference at the half-IF frequency of the new IF), then the IF of the receiver may be switched to the new IF, by setting the current IF to the new IF (conversely the new IF now becomes the old current IF, allowing the steps to repeat to switch back if the interference profiles change) 759. Thereafter, the new "current" IF (e.g., IF2) may be used to generate an IF signal for the RF signal at the "new" current IF if the interference in the RF signal at the half-IF1 frequency exceeded a threshold level. While the interference at the half-IF frequency for the current IF is below the threshold, the IF may stay the same 760. Monitoring and controlling the IF may be ongoing, while the first receiver (receiver 1) continues to process received data 755 using whatever IF has been set.

For example, for a 5 GHz receiver, the IF may be changed dynamically between 1200 and 1000 MHz (e.g., IF1=1200 MHz, IF2=1000 MHz), which would move the "vulnerable" (half-IF) frequency by 100 MHz. The scenario shown in FIG. 7A may represent a worst case. e.g., the nearest "vulnerable" frequencies always occur when the receiver is configured to receive the highest channels in the frequency range when the local oscillator injection is on the low side, so the interference and vulnerable regions are shown on the slope of the RF band pass filter response where the attenuation is a compromise.

In one example, a 5.8 GHz receive frequency is used with an apparatus having an initial (IF2) IF of 1.2 GHz, using low side injection. The local oscillator is initially set at 4.6 GHz (e.g., 5.8 GHz-1.2 GHz). In this mode of operation, the half-IF vulnerability is at 5.2 GHz (e.g., 5.8 GHz-1.2 GHz/2). One approach to avoid that spur of interference may be to shift the IF frequency (either within the pass band of one IF filter or to switch to a separate IF filters) to 1.0 GHz. In that case, to receive 5.8 GHz, the local oscillator would be tuned to 4.8 GHz (with 1 GHz IF rather than 4.6 GHz with the 1.2 GHz IF). Switching in this manner may avoid that half-IF spur. In this example, the monitoring receiver may provide confirmation that the half-IF frequency at 1.0 GHz has a lower interference than the 1.2 GHz. This is just one example of shifting the IF. The implementation of the shifting may depend on the bandwidth of the channels; however in general, the shifting may avoid the interference spur while making the smallest change in the IF. Also, in practice, the methods and apparatuses described herein may be implemented as part of a MIMO system, using multiple (e.g., four live) receivers and antennas.

As mentioned above, the dual receivers described above, as well as the methods and apparatuses for avoiding the half-IF frequency, may be used to help with adjacent channel optimization, enhancing the methods and systems described, for example, in U.S. Pat. No. 8,219,059, previously incorporated by reference in its entirely. U.S. Pat. No. 8,219,059 describes devices and methods for adjacent channel optimization.

In use, an auxiliary (secondary) receiver may be a fully independent receiver (not affecting main or primary receiver). A secondary receiver may be exposed to the whole band, and may be used to detect interference. As discussed above, it may be used to determine interference at known frequencies such as the half-IF frequency, and may provide pass band tuning opportunities based on states of interference. As mentioned above, the additional receiver could also handle Rx traffic during a configuration change of main Rx for filtering and/or switching of the IF, or the like.

An adjacent channel optimized receiver as described in the '059 patent may be modified to include two features; first a bandwidth/filtering selectivity that is known a priori (based on the channel bandwidth used) and a more adaptive implementation of "pass band tuning". The "pass band tuning" is an optional mode where the frequency conversion circuitry places the "desired" signal closer to one IF filter pass band edge than another, in order to take advantage of the higher selectivity that this affords to interference to one side of the desired signal. The Pass Band Tuning is demonstrated in FIG. 8 below.

In FIG. 8, pass-band tuning represents a compromise in that some additional attenuation may be experienced or flatness of the frequency response of the desired channel could be compromised. These are considered to be opportunistic improvements, a compromise in operating performance. In the '059 patent, the receiver/system may adaptively try these pass-band tuning shifts and measure whether improvements were realized. Although this process of "trial" may be effective, it may be more efficient or robust to performing this step concurrently with a second receiver, as it could be performed while operating the receiver.

Thus, in some variations, an apparatus having a high-selective RF circuit as described in the '059 patent may include a monitoring receiver that could independently (without impact to the main RX system and data flow) scan the band for interference, collect statistics, and provide informed decisions to the system as to best use the "high selectivity" features. In addition to using this receiver for optimally using pass band tuning, the monitoring receiver could also spot-check for half-IF spurious vulnerability and inform the system of threats as discussed above. This secondary receiver does not need to be a full 802.11 receiver, but could be a simpler implementation used only for scanning for interference. A secondary (monitoring) receiver may be less sensitive than a traditional receiver. For example, a monitoring receiver may be a zero-IF receiver. The secondary receiver may have a different architecture than the primary receiver, which may not suffer from the same spurious responses/interference as the primary receiver. In some variations the monitoring receiver is a full 802.11 receiver; both the primary and secondary receiver may be full 802.11 receivers.

Figure 8A:
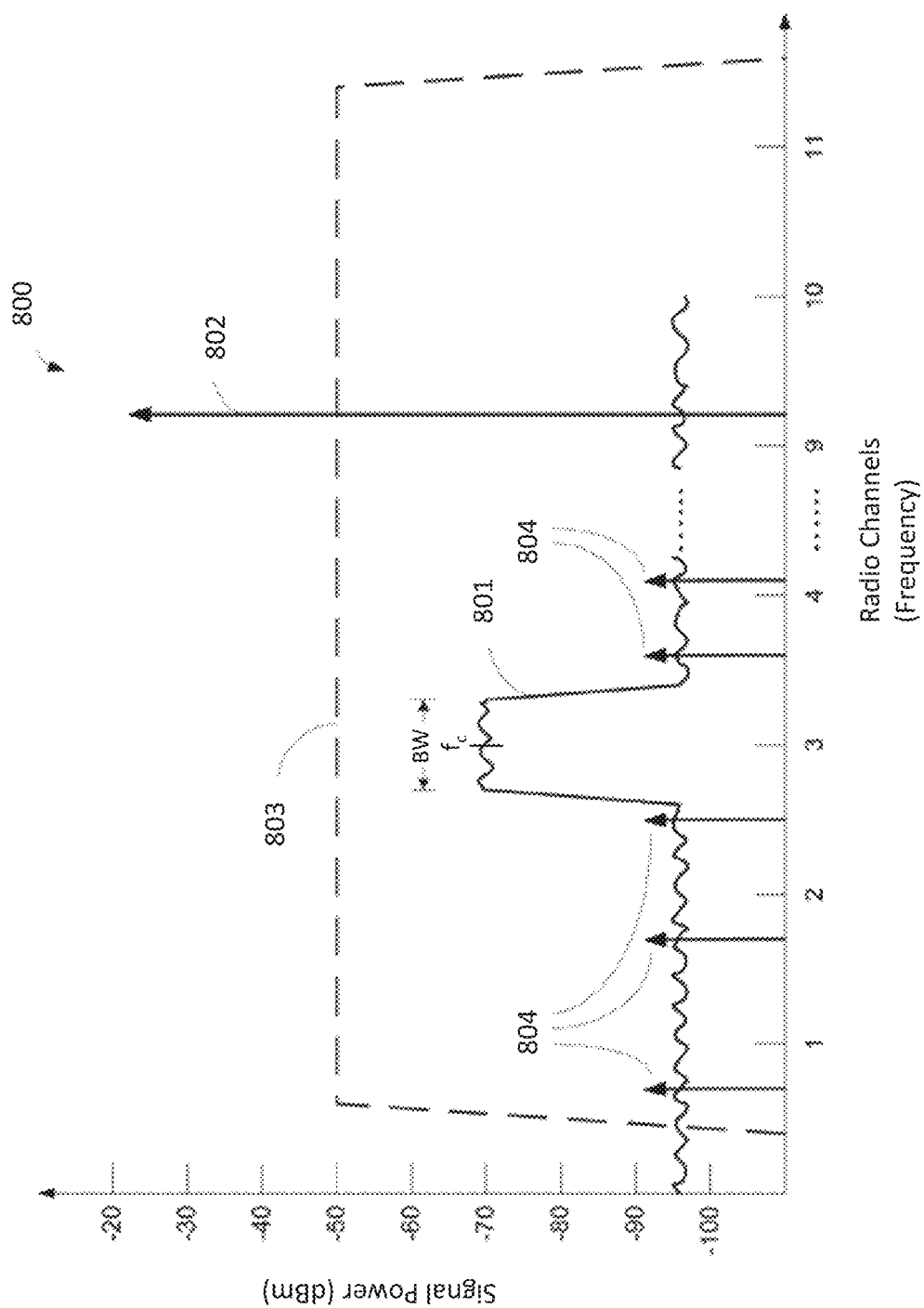
FIGS. 8A and 8B illustrate a frequency spectrum diagram for a radio channel and an adjacent channel desired band strong interferer.
Figure 8B:
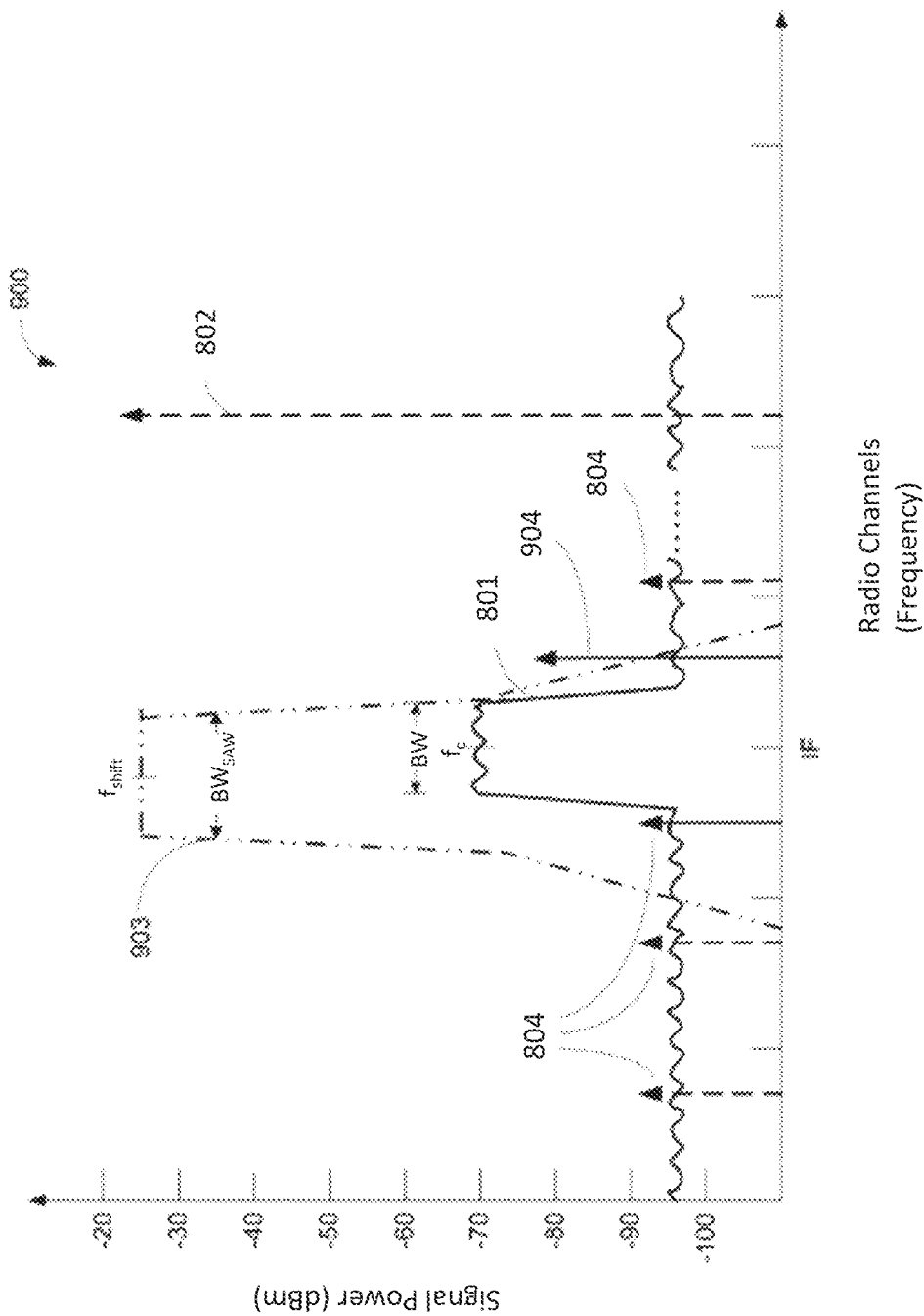

For example, FIGS. 8A and 8B illustrate the operation of a high-selectivity RF circuit, as described in the '059 patent. FIG. 8A illustrates frequency spectrum 800, the frequency spectrum of radio signal. Within the desired band spectrum is the spectrum for the permitted carrier channels. For example, in FIG. 8A, there are 11 radio or carrier channels indicated, representing the 11 channels in the IEEE 802.11b standard. The information signal is illustrated on FIG. 8A by spectrum 801 with the center frequency $f_c$ of radio channel 3 and bandwidth BW. Also within the desired band spectrum is a strong interferer 802 and lesser interferers 804.

High selectivity RF circuit performance may be further improved by shifting the IF, guided by a monitoring receiver as discussed above. For example, consider the situation illustrated in FIG. 8B with frequency spectrum 900, wherein there are lesser interferers 804 and an additional interferer 904 that has slightly stronger signal power than lesser interferers 804. Additional interferer 904 has a signal power of approximately −77 dBm and lesser interferers 804 have signal power of approximately −92 dBm. The IF may be shifted (pass band tuned) to a slightly higher or lower frequency in order to filter a desired band interferer signal. For example, referring to FIG. 8B, frequency spectrum 900 illustrates that if the IF is shifted to a slightly lower frequency, then additional interferer 904 may be partially filtered from the desired band. As shown in FIG. 8B, the IF is shifted from $f_c$ to $f_{shift}$, resulting in spectrum 903 being shifted to a lower frequency than the spectrum 801 of the information signal. In this situation, additional interferer 904 is filtered such that its signal power is reduced from approximately −77 dBm to approximately −92 dBm.

One method of implementing such a pass band tuning is to have the radio receiver determine if there are lesser interferers 804 or an additional interferer 904 in the desired band in close proximity of the skirts of the current channel, at either a higher frequency or lower frequency. If this condition is determined to exist, then the apparatus may send information on the control signal to shift the IF, and instruct the local oscillator (e.g., programmable local oscillator) to generate a new IF that is either slightly higher or slightly lower than the previously specified IF frequency. The value that the IF may shift may vary depending on the specific design. As one example, pass band tuning may shift the IF from 5% to 20% of the IF frequency.

The shifted IF may push a signal up against the edge of the "real" filter. Likely the "real" filter has a gradual roll-off. In this case, one may find that while the desired signal suffers some distortion due to additional attenuation from the IF filter at the edge of the filter, there remains more benefit from the additional rejection of a stronger interferer.

In any of the apparatus and methods described herein, in addition to not disrupting the main receiver for spectrum monitoring tasks, the auxiliary (secondary or monitoring) receiver (if of similar type and capability) could also take over data flow responsibilities briefly while the "high selectivity" receiver is reconfigured, thus providing less interruption in user traffic. The monitoring receiver would not have the same level of selectivity (and may be less sensitive, making it less vulnerable to overload and useful for diagnosing interference), but may be better than having a completely non-functional receiver for the brief time that was needed to reconfigure. The auxiliary RX could also be used for redundancy with the primary receiver.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

As mentioned above, the methods and apparatuses described herein are not limited to eliminating or reducing spurious interferers at a half-IF frequency, but may be used to reduce or eliminate other (including multiple) predictable spurious interferers by dynamically changing the frequency plan in response to actual interference at known frequencies to avoid spurious interference at or near known frequencies or frequency ranges. Thus the apparatus and methods described herein are applicable, and may be readily adapted for use, to reduce or eliminate spurious interference at other vulnerable regions as well. For example, the methods and apparatuses described herein may be used to detect (e.g., using a monitoring receiver) interference such as adjacent channel interference, 2×2 spurious responses, and other interferers and shift or adjust the IF accordingly. For example, the apparatus and systems described herein may be used to examine the frequency spectrum using the auxiliary or monitoring receiver to select an intermediate frequency that minimizes or eliminates spurious interference by looking for interferers at predetermined locations based on two or more intermediate frequencies.

In one example, the desired receiving frequency, Rx, is centered at 5.7 GHz. and the intermediate frequency ($f_{IF}$) is initially 1.2 GHz. A spurious interferer is located at 5.6 GHz (the interferer is 100 MHz lower than the desired receiving frequency). The fro is 4.5 GHz. The spur (spurious interferer) has a RF harmonic (M) at −3-dB (harmonic of interference) and a LO harmonic (N) at 4-dB (LO harmonic). In the super heterodyne receiver, the $f_{interference}$ is 1.2 GHz at the IF, resulting in the spur being located directly on the desired channel. However, as described above, if the intermediate frequency is shifted by 10 MHz, to 1.21 GHz, the spur is displaced by 50 MHz from the desired channel (e.g., $f_{LO}$ is 4.49 GHz. and the $f_{interference}$ is 1.16 GHz at the IF). The interference converted up by the system is 5.65 GHz, with an offset of −0.05 GHz (e.g., 50 MHz below the desired signal).

Similarly, the spur may be avoided by shifting the IF in the other direction by the same amount, for example, by using an IF that is 1.19 GHz or 10 MHz lower than the initial IF. In this example, the same interferer is instead shifted during super heterodyning so that $f_{LO}$ is 4.51 GHz. and the $f_{interference}$ is 1.24. The interference is converted up by the system to 5.75 GHz. Thus, a 10 MHz shift in the IF in the other direction moved the interference to 50 MHz above the desired signal.

This example illustrates how just shifting the IF 10 MHz can push a spurious response 50 MHz away from a desired channel (signal), and the shift can move up or down, depending on the IF chosen. This may aid in determining which IF to apply. For example, the system may be configured to determine which direction to shift the IF when weighing all other conditions, including the locations of other signals, or even limitations of the hardware.

In this example, the change in the IF may be triggered when the frequency of the spur would cause it to overlap or collide with a desired signal during the super heterodyning process. Thus, the decision to shift the IF based on a predetermined frequency (e.g., a spur whose frequency is determined, e.g., by the monitoring receiver) may be made in part by comparing the shift in frequency during super heterodyning, to determine if there is proximity or overlap with a desired signal.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein. Per M.P.E.P. § 2173.05(b), one of ordinary skill in the art would know what is meant by "substantially equal". For example, the phrase "substantially equal" or "substantially the same" in a statement such as "a fourth RF signal having substantially the same carrier frequency as a first RF signal" may mean a radio receiver that receives either RF signal may operate in an equivalent manner.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A wireless radio device configured to select among a plurality of intermediate frequencies to minimize interference, the device comprising:
    one or more antennas;
    a first receiver coupled to the one or more antennas and configured to receive a radio-frequency (RF) signal;
    a second receiver coupled to the one or more antennas, the second receiver configured as a spectrum analyzer to monitor a frequency spectrum and to detect spurious interferers;
    a mixer configured to generate a first intermediate frequency signal from the RF signal by mixing the RF signal with a local oscillation signal having a local oscillation frequency; and
    one or more controllers configured to switch the first intermediate frequency to a second intermediate frequency if an interference in the RF signal exceeds a frequency threshold, wherein the one or more controllers is configured to process an RF signal received from the second receiver while switching the first intermediate frequency to the second intermediate frequency to prevent an interruption in data traffic during the switching.

2. The device of claim 1, further comprising a transmitter or transceiver configured to transmit RF signals.

3. The device of claim 2, wherein the one or more antennas includes at least a receiving antenna for receiving the RF signal and a transmitting antenna for transmitting the RF signals.

4. The device of claim 2, wherein the received RF signal and transmitted RF signals are received and transmitted by the same antenna.

5. The device of claim 1, wherein the mixer is configured to initially set the intermediate frequency to a first intermediate frequency.

6. The device of claim 1, wherein the one or more controllers is configured to switch the second intermediate frequency back to the first intermediate frequency if the interference in the RF signal exceeds a second frequency threshold.

7. The device of claim 1, wherein the one or more controllers is configured to determine if the interference in the RF signal at a first predetermined frequency exceeds the frequency threshold.

8. The device of claim 7, wherein the one or more controllers is configured to switch the second intermediate frequency back to the first intermediate frequency if an interference in the RF signal at a second predetermined frequency exceeds the interference in the RF signal at the first predetermined frequency.

9. The device of claim 7, wherein the first predetermined frequency is one-half of the first intermediate frequency.

10. The device of claim 7, wherein the one or more controllers is configured to determine if the interference in the RF signal at the first predetermined frequency exceeds the frequency threshold by comparing an error rate at the first predetermined frequency with the frequency threshold.

11. The device of claim 1, wherein the one or more controllers is configured to determine if the interference in the RF signal exceeds the frequency threshold.

12. The device of claim 1, further comprising a spectrum processor configured to transmit spectrum information and geographic location information to a remote spectrum analysis unit.

13. The device of claim 12, wherein the mixer is configured to operate in a channel corresponding to the first intermediate frequency signal based on information received from the remote spectrum analysis unit.

14. The device of claim 1, wherein the spectrum analyzer is configured to scan through channels of an operating band of the wireless radio device.

15. The device of claim 1, wherein the spectrum analyzer is configured to scan through a band that is larger than an operating band of the wireless radio device to bracketing the operating band on one or both sides.

16. A method selecting among a plurality of intermediate frequencies of a wireless radio device to minimize interference, the method comprising:
    receiving, using a first receiver, a radio-frequency (RF) signal;
    monitoring, using a second receiver configured as a spectrum analyzer, a frequency spectrum to detect spurious interferers;
    generating a first intermediate frequency signal from the RF signal by mixing the RF signal with a local oscillation signal having a local oscillation frequency;
    switching the first intermediate frequency to a second intermediate frequency if an interference in the RF signal exceeds a frequency threshold; and
    processing an RF signal received from the second receiver while switching the first intermediate frequency to the second intermediate frequency to prevent an interruption in data traffic during the switching.

17. The method of claim 16, further comprising transmitting RF signals, wherein the received RF signal is received by a receiving antenna, and the transmitted RF signals are transmitted by a transmitting antenna.

18. The method of claim 16, further comprising transmitting RF signals, wherein the received RF signal and the transmitted RF signals are received and transmitted by the same antenna.

19. The method of claim 16, determining if the interference in the RF signal exceeds the frequency threshold comprises determining if the interference in the RF at a first predetermined frequency exceeds the frequency threshold.

20. The method of claim 19, further comprising switching the second intermediate frequency back to the first intermediate frequency if an interference in the RF signal at a second predetermined frequency exceeds the interference in the RF signal at the first predetermined frequency.

* * * * *